US010959066B2

(12) United States Patent
Zevallos

(10) Patent No.: US 10,959,066 B2
(45) Date of Patent: Mar. 23, 2021

(54) METHOD AND SYSTEM FOR ACCESS PROTOCOL OPTIMIZATION FOR NARROW BAND INTERNET-OF-THINGS DEVICES WITHIN A NETWORK ENVIRONMENT

(71) Applicant: Nokia Technologies Oy, Espoo (FI)

(72) Inventor: Cesar Augusto Zevallos, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/488,386

(22) PCT Filed: Feb. 23, 2017

(86) PCT No.: PCT/IB2017/051051
§ 371 (c)(1),
(2) Date: Aug. 23, 2019

(87) PCT Pub. No.: WO2018/154356
PCT Pub. Date: Aug. 30, 2018

(65) Prior Publication Data
US 2020/0236515 A1 Jul. 23, 2020

(51) Int. Cl.
*H04M 11/00* (2006.01)
*H04M 15/00* (2006.01)
(Continued)

(52) U.S. Cl.
CPC ........... *H04W 4/24* (2013.01); *H04L 12/1407* (2013.01); *H04L 12/1417* (2013.01);
(Continued)

(58) Field of Classification Search
None
See application file for complete search history.

(56) References Cited

U.S. PATENT DOCUMENTS 9,253,335 B1 * 2/2016 Subramanian .... H04M 15/8228
9,258,433 B1    2/2016 Subramanian et al.
(Continued)

FOREIGN PATENT DOCUMENTS

WO    WO 2014/070649 A1    5/2014
WO    WO 2015 028070 A1    3/2015
(Continued)

OTHER PUBLICATIONS

Huawei et al., *Clarification of IP Via NAS Solution*, 3GPP Draft; S2-133009, 3$^{rd}$ Generational partnership Project (3GPP), Mobile Competence Centre, vol. SA WG2, No. Valencia, Spain (Jul. 19, 2013), 14 pages.
(Continued)

*Primary Examiner* — Gary Lafontant
(74) *Attorney, Agent, or Firm* — Alston & Bird LLP

(57) ABSTRACT

A method, apparatus and computer program product are provided in accordance with example embodiments in order to provide methods, apparatuses, and/or systems that reduce and/or eliminate network inefficiencies caused by the traffic profile associated with narrow band Internet-of-Things (NB-IoT) devices and similar devices, by applying and optimizing protocols governing the allocation of network resources to such devices. In some example implementations, a serving gateway (SGW) and/or a packet data network gateway (PGW) is locally configured with a threshold set that includes limits on the permissible traffic associated with a NB-IoT device and/or a similar device over a given unit of time. To the extent that the traffic remains within such limits, generation of charging data records (CDRs) and signaling to an online charging server may be reduced or eliminated.

15 Claims, 8 Drawing Sheets

(51) Int. Cl.
*H04W 4/24* (2018.01)
*H04L 12/14* (2006.01)
*H04L 12/28* (2006.01)
*H04L 12/26* (2006.01)

(52) U.S. Cl.
CPC ...... *H04L 12/2834* (2013.01); *H04L 43/0894* (2013.01); *H04M 15/39* (2013.01); *H04M 15/41* (2013.01); *H04M 15/66* (2013.01); *H04M 15/852* (2013.01); *H04M 15/882* (2013.01); *H04M 15/883* (2013.01)

(56) References Cited

U.S. PATENT DOCUMENTS

| | | | |
|---|---|---|---|
| 2012/0129490 A1 | 5/2012 | Sharma et al. | |
| 2013/0279521 A1 | 10/2013 | Perez Martinez et al. | |
| 2015/0003299 A1 | 1/2015 | Li | |
| 2018/0352593 A1* | 12/2018 | Velev | H04W 24/08 |
| 2019/0014001 A1* | 1/2019 | Tamura | H04W 60/00 |

FOREIGN PATENT DOCUMENTS

| WO | WO 2015/037181 A1 | 3/2015 |
|---|---|---|
| WO | WO 2016/150508 A1 | 9/2016 |

OTHER PUBLICATIONS

International Search Report and Written Opinion for Application No. PCT/IB2017/051051 dated Oct. 18, 2017, 11 pages.

Standards-Based Online Charging-Maximizing Utility, http://www.immagic.com/eLibrary/ARCHIVES/GENERAL/SNDVN_CA/S130204S.pdf (dated Jun. 27, 2012) 14 pages.

3$^{rd}$ Generation Partnership Project; Technical Specification Group Services and system Aspects; Study on Architecture Enhancements for Cellular Internet of Things (Release 13), 3GPP TR 23.720 V13.0.0 (Mar. 2016), 94 pages.

3$^{rd}$ Generation Partnership Project; Technical Specification Group Services and Systems Aspects; General Packet Radio Service (GPRS) Enhancements for Evolved Universal Terrestrial Radio Access Network (E-UTRAN) Access (Release 14), 3GPP TS 23.401 V14.1.0 (Sep. 2016), 379 pages.

3$^{rd}$ Generation Partnership Project; Technical Specification Group Services and System Aspects; Telecommunication Management; Charging Management; Charging Architecture and Principals (Release 14), 3GPP TS 32.240 V14.1.0 (Sep. 2016), 56 Pages.

3$^{rd}$ Generation Partnership Project; Technical Specification Group Services and System Aspects; Telecommunication Management; Charging Management; Packet Switched (PS) Doman Charging (Release 14), 3GPP TS 32.251 V14.0.1 (Oct. 2016), 184 pages.

3$^{rd}$ Generation Partnership Project; Technical Specification Group Services and System Aspects; Telecommunication Management; Charging Management; Charging Data Record (CDR) Parameter Description (Release 14), 3GPP TS 32.298 V14.0.0 (Sep. 2016), 204 pages.

3$^{rd}$ Generation Partnership Project; Technical Specification Group Services and System Aspects; Telecommunication Management; Charging Management; Diameter Charging Applications (Release 14), 3GPP TS 32.299 V14.1.0 (Sep. 2016), 191 pages.

* cited by examiner

METHOD AND SYSTEM FOR ACCESS PROTOCOL OPTIMIZATION FOR NARROW BAND INTERNET-OF-THINGS DEVICES WITHIN A NETWORK ENVIRONMENT

CROSS-REFERENCE TO RELATED APPLICATIONS

This application is a national phase entry of International Application No. PCT/IB2017/051051, filed Feb. 23, 2017, the entire contents of which are incorporated herein by reference.

TECHNICAL FIELD

An example embodiment relates generally to communications network access and communications technology, particularly in the context of network resource allocation protocols that may be applied to Internet-of-Things devices within a given network environment.

BACKGROUND

Over the past few years, the components and related technology necessary to facilitate communication with a network have become smaller in size and less costly. At the same time, many individuals and businesses have come to expect and demand the ability to readily access and manage data about many aspects of their day-to-day lives and operations. As a result, many devices that were not historically configured to interact with a network, such as cars, appliances, personal accessories, and the like, have been redesigned, retrofitted, and otherwise configured to interact with communications networks. Consequently, many network operators increasingly face demands to accommodate network traffic that involves numerous devices beyond the typical mobile devices, personal computers, and other user equipment that have traditionally interacted with communications networks. While networks and their operators are typically able to meet user expectation and demands, these ever-increasing demands for network connectivity and throughput can place strains on finite network resources.

Network operators constantly seek to reduce or eliminate sources of potential network inefficiencies that divert network resources and otherwise contribute to undesirable network performance. Handling an ever-increasing volume of traffic from non-traditional devices and balancing that volume with the demands and expectations of more traditional uses and users within a network environment raises a number of technical challenges. The inventor of the invention disclosed herein has identified these and other technical challenges, and developed the solutions described and otherwise referenced herein.

BRIEF SUMMARY

A method, apparatus and computer program product are therefore provided in accordance with an example embodiment in order to provide methods, apparatuses, and/or systems that apply and optimize protocols governing the allocation of network resources to narrow band Internet-of-things devices.

In an example embodiment, a method is provided that includes applying, at a serving gateway (SGW), a first local configuration, wherein the first local configuration comprises a first threshold set comprising a first set of limits, to be applied on a per-bearer basis, for user traffic associated with a user equipment device; applying, at a packet data network gateway (PGW), a second local configuration, wherein the second local configuration comprises a second threshold set comprising a second set of limits, to be applied on a per-bearer basis or a per rating group basis, for the user traffic associated with the user equipment device; detecting if a portion of the user traffic associated with the user equipment device exceeds any limit in the first threshold set or any limit in the second threshold set; and based at least in part on determining that the portion of the user traffic associated with the user equipment device exceeds any limit in the first threshold set or any limit in the second threshold set: metering, on a per-time-unit basis, the portion of the user traffic associated with the user equipment device that exceeds any limit in the first threshold set or any limit in the second threshold set, and establishing a credit control session with an online charging server.

In some example implementations of such a method, the user equipment device is a narrow-band Internet-of-Things (NB-IoT) device. In some such example implementations, and in other example implementations, the first set of limits comprises a threshold limit on a quantity of downlink messages (or bytes, for example) per a unit of time. In some such example implementations, and in other example implementations, the first set of limits comprises a threshold limit on a quantity of uplink messages (or bytes, for example) per a unit of time. In some such example implementations, and in other example implementations, the second set of limits comprises a threshold limit on a quantity of downlink messages (or bytes, for example) per a unit of time. In some such example implementations, and in other example implementations, the second set of limits comprises a threshold limit on a quantity of uplink messages (or bytes, for example) per a unit of time.

In some such example implementations, and in other example implementations, the method further comprises determining whether to generate a Charging Data Record (CDR) for the portion of the user traffic that exceeds any limit in the first threshold set or any limit in the second threshold set.

In some such example implementations, and in other example implementations, the method further comprises determining whether to grant or deny a quota for the portion of the user traffic that exceeds any limit in the first threshold set or any limit in the second threshold set.

In another example embodiment, an apparatus is provided that includes at least one processor and at least one memory that includes computer program code with the at least one memory and the computer program code configured to, with the at least one processor, cause the apparatus to at least apply, at a serving gateway (SGW), a first local configuration, wherein the first local configuration comprises a first threshold set comprising a first set of limits, to be applied on a per-bearer basis, for user traffic associated with a user equipment device; apply, at a packet data network gateway (PGW), a second local configuration, wherein the second local configuration comprises a second threshold set comprising a second set of limits, to be applied on a per-bearer basis or a per rating group basis, for the user traffic associated with the user equipment device; detect if a portion of the user traffic associated with the user equipment device exceeds any limit in the first threshold set or any limit in the second threshold set; and based at least in part on determining that the portion of the user traffic associated with the user equipment device exceeds any limit in the first threshold set or any limit in the second threshold set: meter, on a per-time-unit basis, the portion of the user traffic associated with the user equipment device that exceeds any limit in the first threshold set or any limit in the second threshold set, and establish a credit control session with an online charging server.

In some example implementations of such an apparatus, the user equipment device is a narrow-band Internet-of-Things (NB-IoT) device. In some such example implementations, and in other example implementations, the first set of limits comprises a threshold limit on a quantity of downlink messages (or bytes, for example) per a unit of time. In some such example implementations, and in other example implementations, the first set of limits comprises a threshold limit on a quantity of uplink messages (or bytes, for example) per a unit of time. In some such example implementations, and in other example implementations, the second set of limits comprises a threshold limit on a quantity of downlink messages (or bytes, for example) per a unit of time. In some such example implementations, and in other example implementations, the second set of limits comprises a threshold limit on a quantity of uplink messages (or bytes, for example) per a unit of time.

In some such example implementations, and in other example implementations, the at least one memory and the computer program code are further configured to, with the processor, cause the apparatus to determine whether to generate a Charging Data Record (CDR) for the portion of the user traffic that exceeds any limit in the first threshold set or any limit in the second threshold set.

In some such example implementations, and in other example implementations, the at least one memory and the computer program code are further configured to, with the processor, cause the apparatus to determine whether to grant or deny a quota for the portion of the user traffic that exceeds any limit in the first threshold set or any limit in the second threshold set.

In a further example embodiment, a computer program product is provided that includes at least one non-transitory computer-readable storage medium having computer-executable program code instructions stored therein with the computer-executable program code instructions including program code instructions configured to apply, at a serving gateway (SGW), a first local configuration, wherein the first local configuration comprises a first threshold set comprising a first set of limits, to be applied on a per-bearer basis, for user traffic associated with a user equipment device; apply, at a packet data network gateway (PGW), a second local configuration, wherein the second local configuration comprises a second threshold set comprising a second set of limits, to be applied on a per-bearer basis or a per rating group basis, for the user traffic associated with the user equipment device; detect if a portion of the user traffic associated with the user equipment device exceeds any limit in the first threshold set or any limit in the second threshold set; and based at least in part on determining that the portion of the user traffic associated with the user equipment device exceeds any limit in the first threshold set or any limit in the second threshold set: meter, on a per-time-unit basis, the portion of the user traffic associated with the user equipment device that exceeds any limit in the first threshold set or any limit in the second threshold set, and establish a credit control session with an online charging server.

In some example implementations of such a computer program product, the user equipment device is a narrow-band Internet-of-Things (NB-IoT) device. In some such example implementations, and in other example implementations, the first set of limits comprises a threshold limit on a quantity of downlink messages (or bytes, for example) per a unit of time. In some such example implementations, and in other example implementations, the first set of limits comprises a threshold limit on a quantity of uplink messages (or bytes, for example) per a unit of time. In some such example implementations, and in other example implementations, the second set of limits comprises a threshold limit on a quantity of downlink messages (or bytes, for example) per a unit of time. In some such example implementations, and in other example implementations, the second set of limits comprises a threshold limit on a quantity of uplink messages (or bytes, for example) per a unit of time.

In some such example implementations, and in other example implementations, the computer-executable program code instructions further comprise program code instructions configured to determine whether to generate a Charging Data Record (CDR) for the portion of the user traffic that exceeds any limit in the first threshold set or any limit in the second threshold set.

In some such example implementations, and in other example implementations, the computer-executable program code instructions further comprise program code instructions configured to determine whether to grant or deny a quota for the portion of the user traffic that exceeds any limit in the first threshold set or any limit in the second threshold set.

In yet another example embodiment, an apparatus is provided that includes means for applying, at a serving gateway (SGW), a first local configuration, wherein the first local configuration comprises a first threshold set comprising a first set of limits, to be applied on a per-bearer basis, for user traffic associated with a user equipment device; applying, at a packet data network gateway (PGW), a second local configuration, wherein the second local configuration comprises a second threshold set comprising a second set of limits, to be applied on a per-bearer basis or a per rating group basis, for the user traffic associated with the user equipment device; detecting if a portion of the user traffic associated with the user equipment device exceeds any limit in the first threshold set or any limit in the second threshold set; and based at least in part on determining that the portion of the user traffic associated with the user equipment device exceeds any limit in the first threshold set or any limit in the second threshold set: metering, on a per-time-unit basis, the portion of the user traffic associated with the user equipment device that exceeds any limit in the first threshold set or any limit in the second threshold set, and establishing a credit control session with an online charging server.

In some example implementations of such an apparatus, the user equipment device is a narrow-band Internet-of-Things (NB-IoT) device. In some such example implementations, and in other example implementations, the first set of limits comprises a threshold limit on a quantity of downlink messages (or bytes, for example) per a unit of time. In some such example implementations, and in other example implementations, the first set of limits comprises a threshold limit on a quantity of uplink messages (or bytes, for example) per a unit of time. In some such example implementations, and in other example implementations, the second set of limits comprises a threshold limit on a quantity of downlink messages (or bytes, for example) per a unit of time. In some such example implementations, and in other example implementations, the second set of limits comprises a threshold limit on a quantity of uplink messages (or bytes, for example) per a unit of time.

In some such example implementations, and in other example implementations, the apparatus further includes means for determining whether to generate a Charging Data Record (CDR) for the portion of the user traffic that exceeds any limit in the first threshold set or any limit in the second threshold set.

In some such example implementations, and in other example implementations, the apparatus further includes means for determining whether to grant or deny a quota for the portion of the user traffic that exceeds any limit in the first threshold set or any limit in the second threshold set.

BRIEF DESCRIPTION OF THE DRAWINGS

Figure 1:
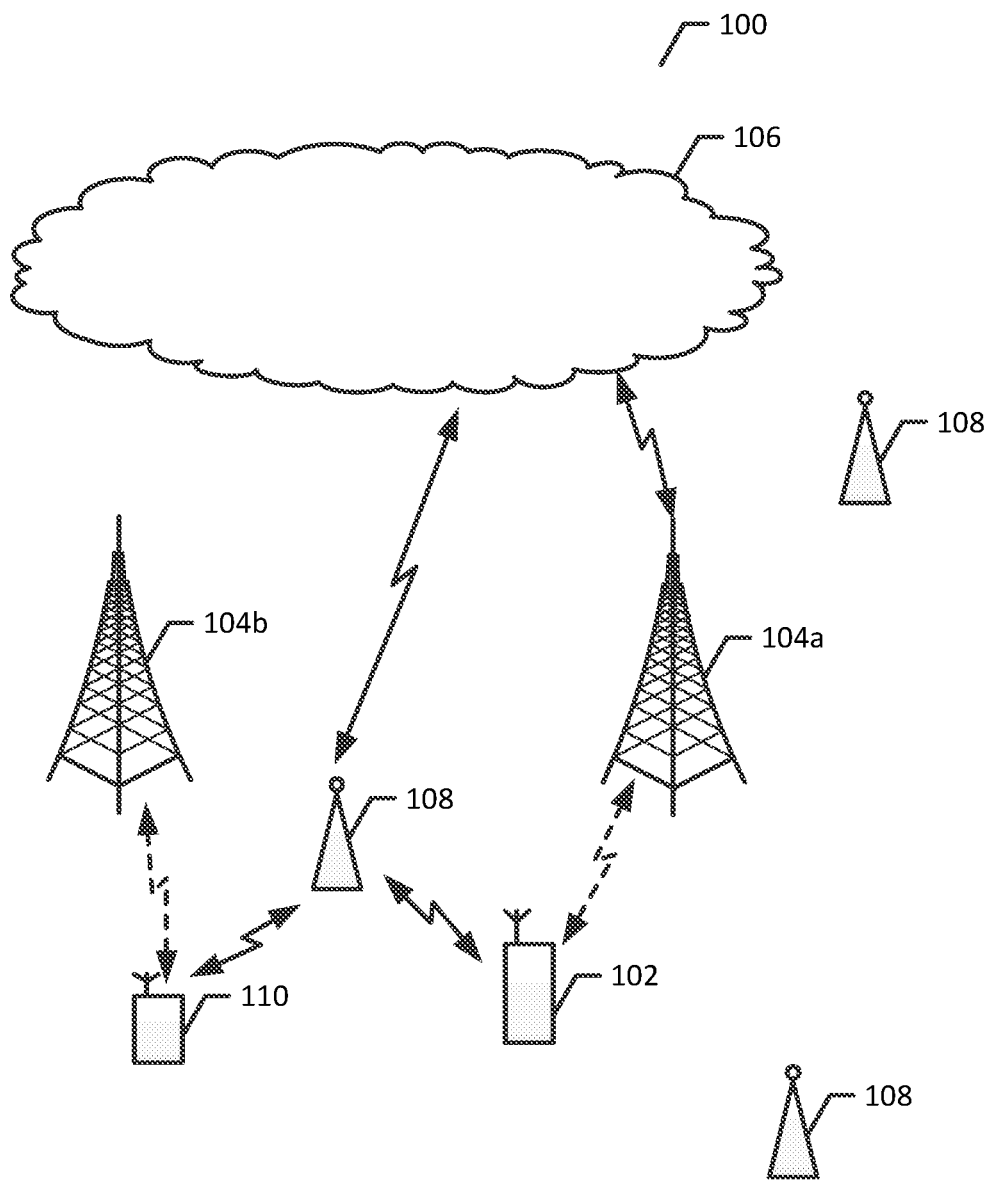
Figure 2:
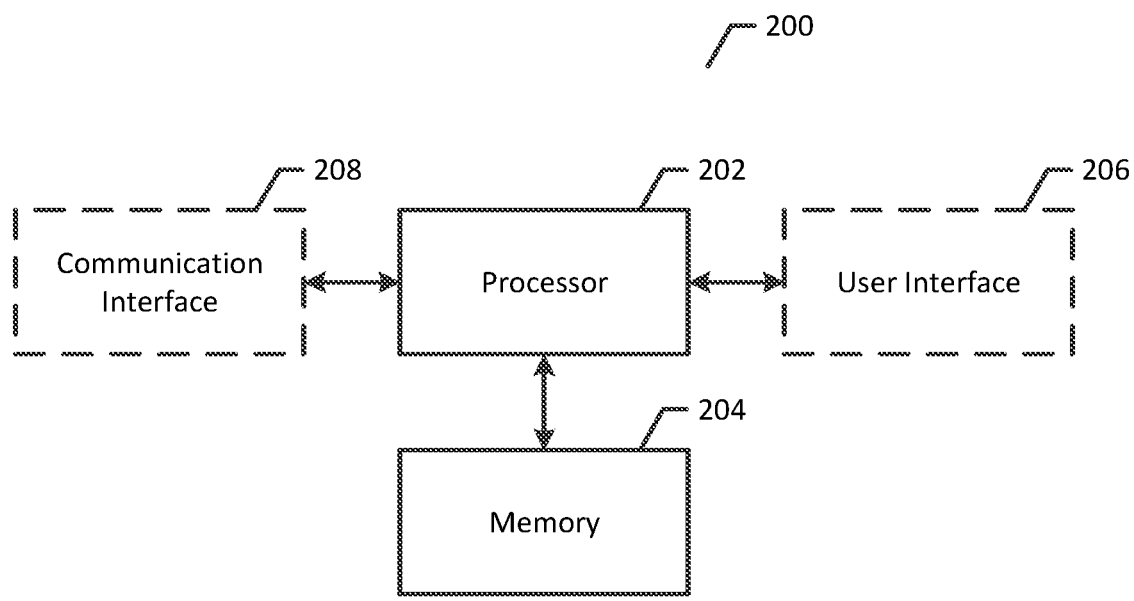
Figure 3:
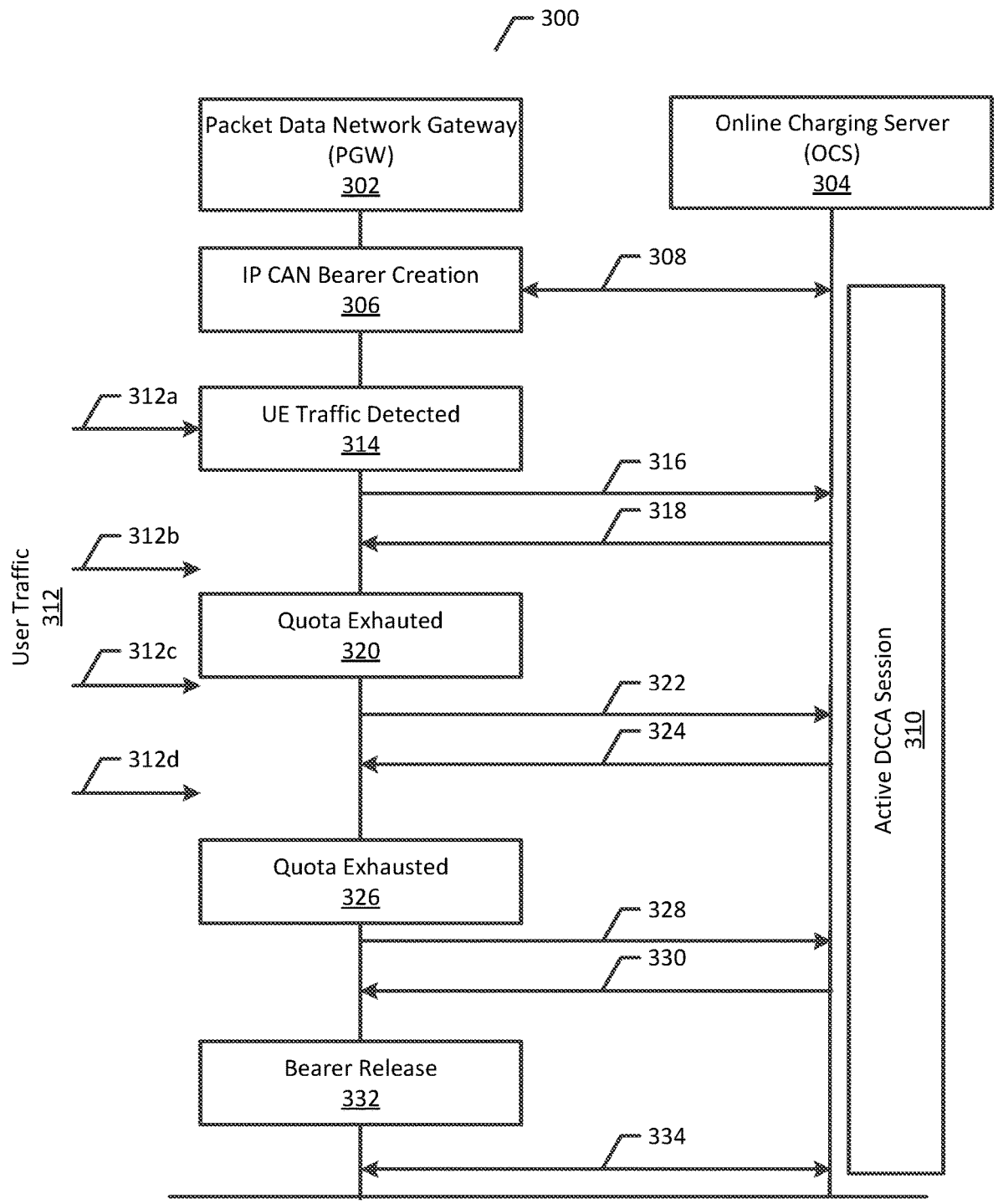
Figure 4:
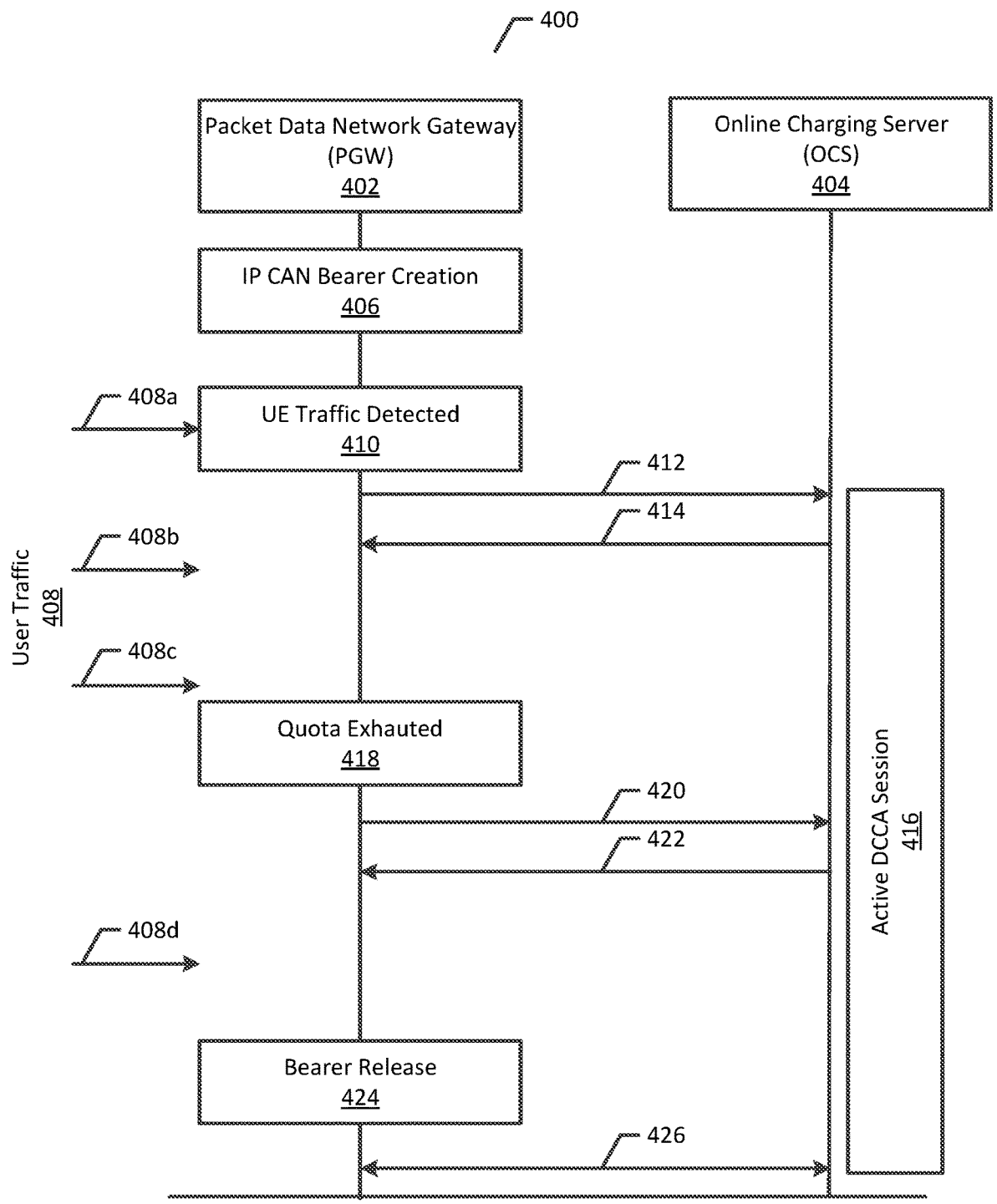
Figure 5:
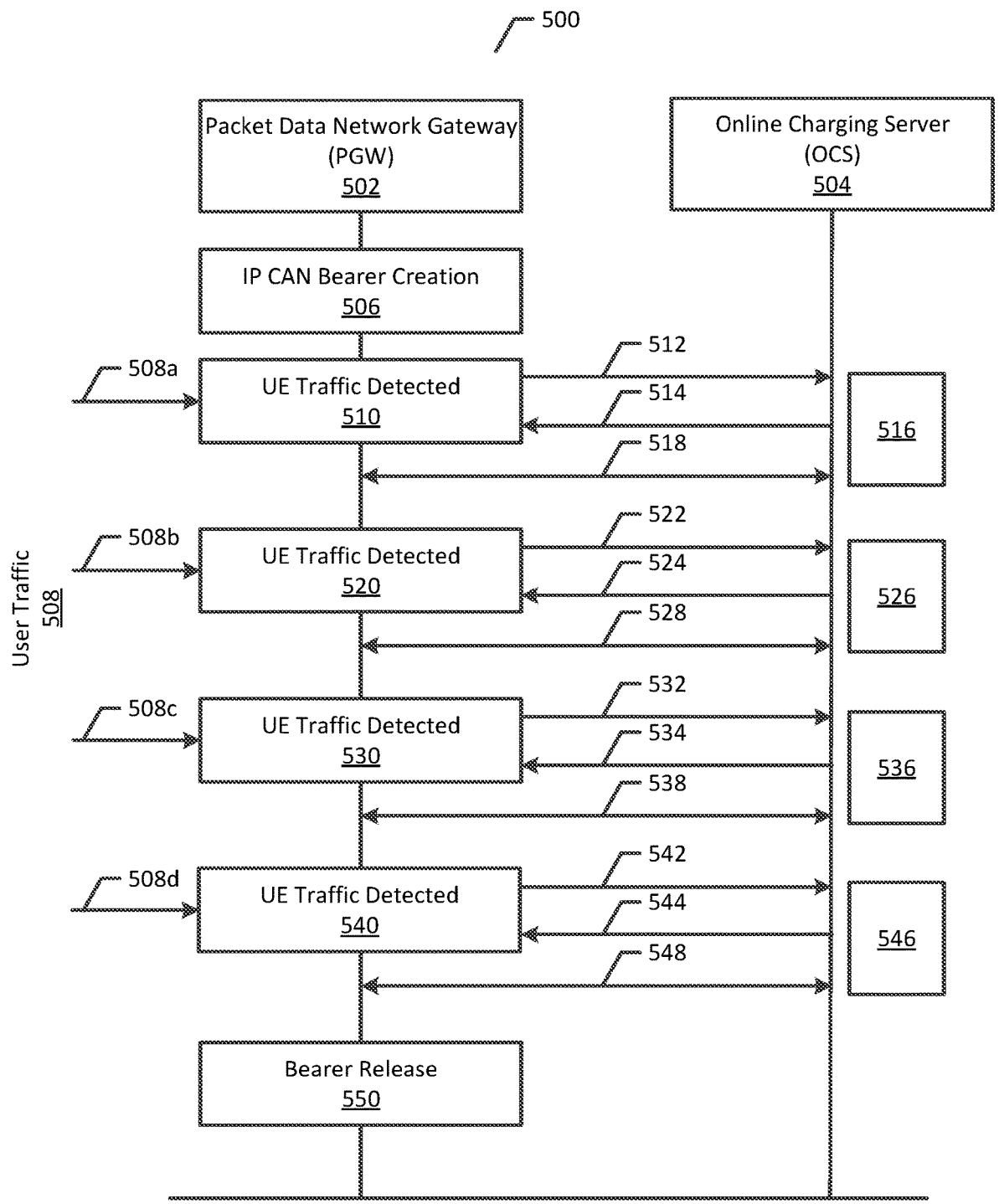
Figure 6:
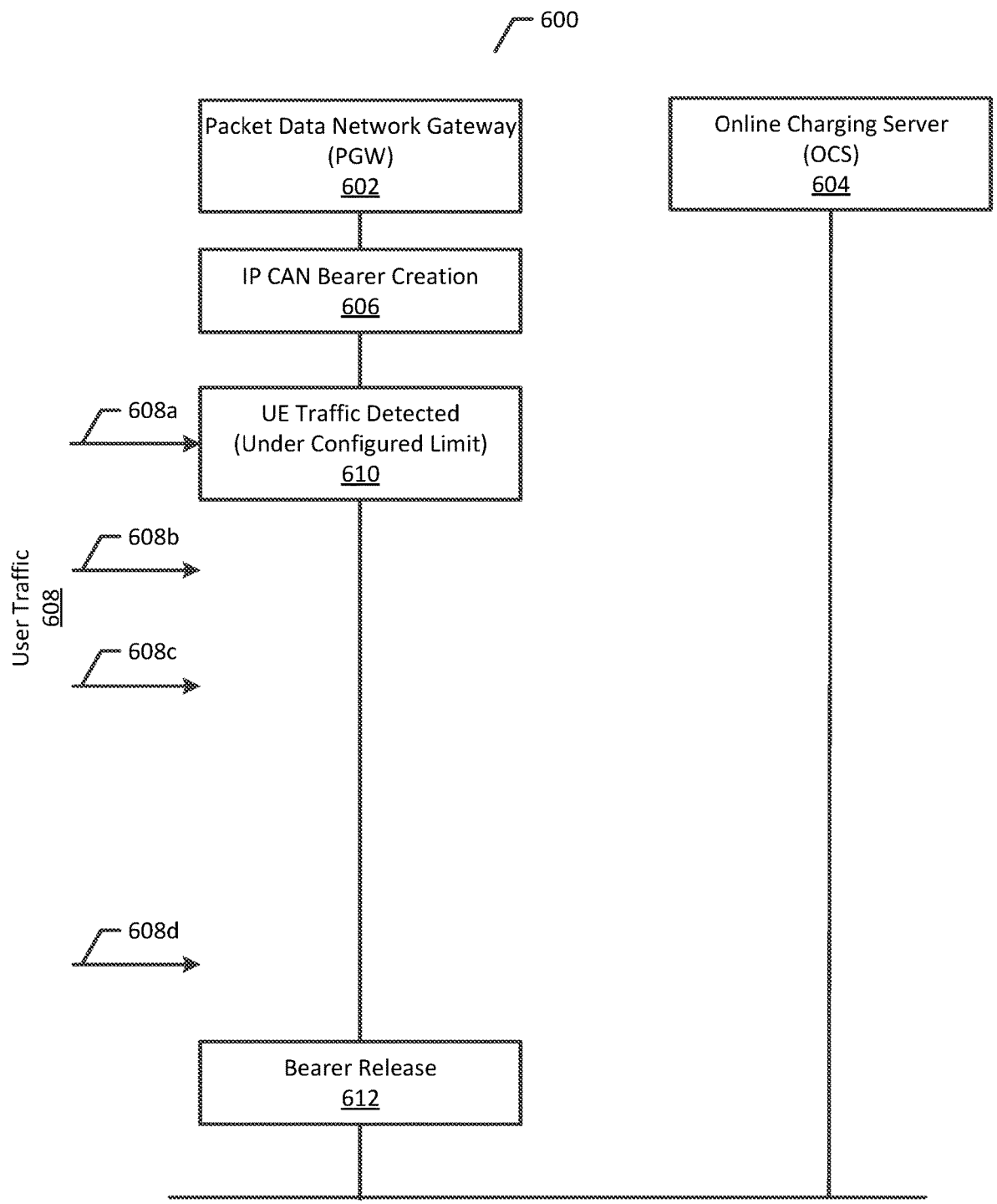
Figure 7:
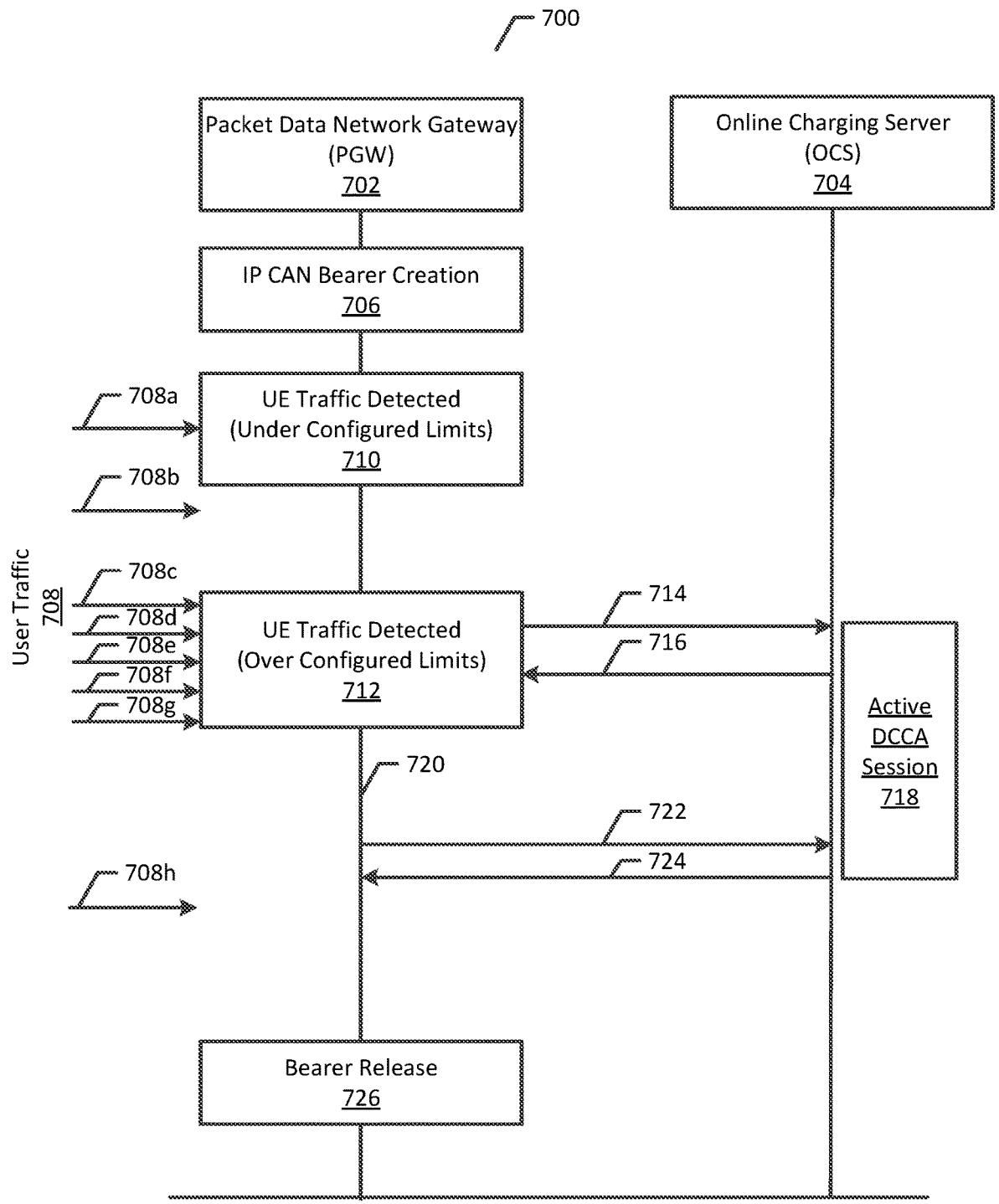
Figure 8:
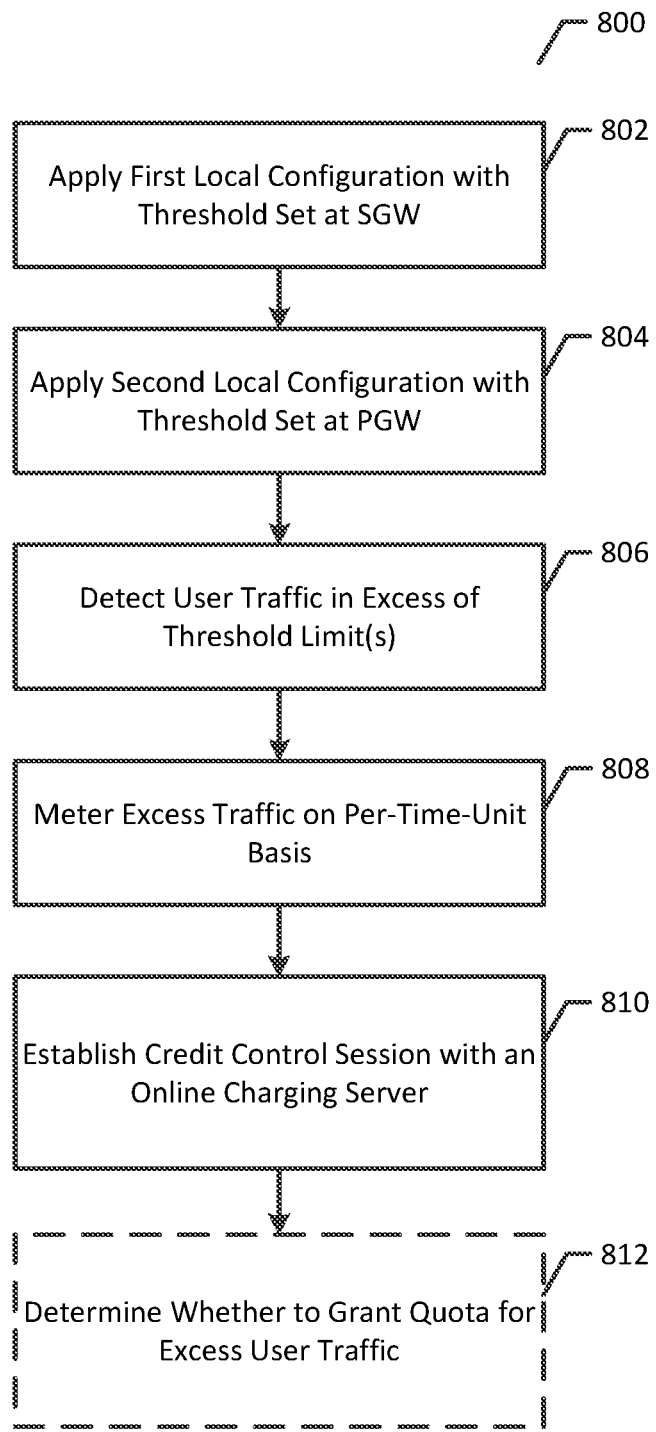

Having thus described certain example embodiments of the present disclosure in general terms, reference will hereinafter be made to the accompanying drawings, which are not necessarily drawn to scale, and wherein:

FIG. 1 depicts an example system environment in which implementations in accordance with an example embodiment of the present invention may be performed;

FIG. 2 is a block diagram of an apparatus that may be specifically configured in accordance with an example embodiment of the present invention;

FIG. 3 is a message flow diagram that illustrates a technical challenge that may be overcome by implementations of example embodiments of the present invention;

FIG. 4 is another message flow diagram that illustrates a technical challenge that may be overcome by implementations of example embodiments of the present invention;

FIG. 5 is another message flow diagram that illustrates a technical challenge that may be overcome by implementations of example embodiments of the present invention;

FIG. 6 is a message flow diagram that illustrates aspects of an example embodiment of the present invention;

FIG. 7 is a message flow diagram that illustrates aspects of an example embodiment of the present invention; and FIG. 8 is a flowchart illustrating a set of operations performed, such as by the apparatus of FIG. 2, in accordance with an example embodiment of the present invention.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with example embodiments in order to provide for the application and optimization of protocols governing the allocation of network resources to narrow band Internet-of-things (NB-IoT) devices. Many implementations of example embodiments of the invention described and otherwise disclosed herein are directed to solving the technical challenges associated with enabling and charging for the efficient handling of relatively infrequent, relatively small data transmissions, such as those that may be received from NB-IoT devices, other IoT devices, and the like, for example.

The confluence of a number of technical trends have begun to dramatically alter the makeup of network traffic that is presented to, and handled by, communications networks. Over the past several years, many devices, such as vehicles, appliances, wearable items, HVAC equipment and other in-building systems, home entertainment equipment, and the like have been increasing designed, retrofitted, and/or otherwise configured to incorporate microprocessors and/or other computing devices that are capable of controlling and/or monitoring the operation and use of the larger device into which they are incorporated. In parallel with this trend, wireless communications networks capable of handling a wide variety of network traffic have become nearly ubiquitous. As network speeds, bandwidth, and connectivity have increased, so too have user expectations, particularly with respect to the desire and ability of many users to remotely monitor, control, and/or otherwise interact with the devices that they use in their day-to-day lives. These trends, and the decrease in the size and costs associated with incorporating wireless communication technology into many devices, have given rise to a large and ever-increasing number of devices that now interact with communications networks. These devices are often referred to as part of the Internet-of-Things or IoT, particularly in contexts where it may be beneficial to distinguish such devices from traditional networked devices, such as smartphones and/or other mobile devices, personal computers, and the like.

The Cellular Internet of Things (C-IoT), which often involves the use of cellular network connectivity to facilitate communication with an IoT-enabled device, is a constantly and rapidly developing area of technology. As part of recognizing this development, 3GPP has taken steps towards enhancing the EPS architecture for an efficient handling of infrequent small data transmissions. For example, the 3GPP study item 23.720 was recently finalized, and some proposed solutions have been propagated into the corresponding 3GPP Architecture Specifications However, a number of technical challenges associated with handling and charging for the sorts of relatively small, relatively infrequent transmissions that are commonly associated with C-IoT, NB-IoT, and/or other IoT devices remain.

For example, some of the conventional network protocol specifications define a mechanism that is designed to protect the network from a User Equipment (UE) device that may be generating an excessive volume of messages (or bytes, for example). In many contexts, such functionality is referred to as "Rate Control" (and may, for example, be subdivided into PLMN Rate Control and APN Rate Control). Typically, Rate Control functionality limits a UE device to a predetermined number of messages (or bytes, for example) in the uplink direction and a predetermined number of messages (or bytes, for example) in the downlink direction. In many such situations, the limit on uplink and downlink transmissions are established by a network operator, and may be based on a subscription and/or other agreement. In such contexts, messages (or bytes, for example) which exceed those limits are dropped.

Dropping such traffic raises at least two main issues that can be particularly relevant to situations involving NB-IoT devices. First, the user experience associated with an NB-IoT device may be adversely impacted (and interpreted as bad service, for example) due to the dropped traffic. Second, the network operator will likely lose revenue, particularly in situations where the network might be able to forward the traffic that exceeds the predetermined Rate Control limits and charge a premium for the extra traffic generated by the NB-IoT device. Some implementations of example embodiments of the invention described and/or otherwise disclosed herein contemplate uses cases that address this challenge by applying charging protocols that only drop truly excessive NB-IoT-based network traffic.

Additional technical challenges can arise when attempting to adapt traditional approaches to limiting UE traffic, such as traditional offline and online charging specifications for example, to support NB-IoT traffic. In many such attempted adaptations, the NB-IoT traffic and/or similar traffic is identified and indicated in the charging data. However, it will be appreciated that this type of indication is not a substantive change to traditional charging specifications, and is instead a cosmetic change which does not optimize charging interfaces to the nature of the massive number of devices generating relatively small and relatively infrequent traffic. In particular, if an operator decides to enable offline charging in a context where NB-IoT and/or similar traffic is simply noted or indicated in the charging data, the result is the generation of a large volume of charging data records (CDRs), each of which contain very small chargeable data. Additional issues exist in such situations with respect to online charging. For example, if an operator decides to enable online charging in a context where NB-IoT and/or similar traffic is simply noted or indicated in the charging data, the signaling required by the NB-IoT device is similar to the signaling generated by a smartphone or other traditional UE device. As a result, the millions of NB-IoT-devices that may be interacting with a given network and/or portion of the network might overload the relevant online charging systems, particular in situations where signaling reduction procedures have only been performed in the Radio and EPS access networks, such that the online charging signaling required for each NB-IoT device or similar device is the same or similar to that required for each LTE device or similar device.

It will be appreciated that, to the extent that 3GPP specifies that online charging applies to NB-IoT devices and/or similar devices, then there is the potential for all relevant vendors to be required to implement one or more online charging interfaces for NB-IoT devices and/or similar devices.

In FIGS. 3, 4, and 5, specific aspects of some of the technical challenges associated with conventional-type charging configurations that may be available to operators are illustrated. While many of the particular examples discussed with respect to the figures herein contemplate UE traffic that follows a traffic profile similar to that of many NB-IoT devices (namely, relatively small and infrequent UE traffic, such as on the order of one message sized at a few kilobytes transmitted every few hours, for example), the concepts and issues discussed with respect to the figures may have applicability in contexts and situations involving other traffic profiles.

FIG. 3 depicts an example message flow 300 between a packet data network gateway (PGW) 302 and an online charging server (OCS) 304. Message flow 300 may be characterized as a basic charging mechanism that may be applied by network operators. As shown in FIG. 3, example message flow 300 commences at block 306 with the creation of an IP connectivity access network (IP-CAN) bearer creation. Upon creation of the relevant IP-CAN bearer, the PGW 302 exchanges message 308 with OCS 304. Typically, message 308 takes the form of an initial credit control request (CCR-I) and a related initial credit control answer (CCA-I). Upon the exchange of message 308, the OCS 304 establishes an active diameter credit control application session (DCCA) 310, which remains active throughout the relevant time associated with example message flow 300.

Example message flow 300 also contemplates the existence of user traffic 312, which may be generated and/or otherwise associated with an NB-IoT device, and may, such as in the example depicted in FIG. 3, involve the transmission of a series of relatively small and relatively infrequent transmissions 312a, 312b, 312c, and 312d, which may, for example, be single messages sized on the order of a few kilobytes, which are transmitted once every few hours. As shown at block 314, the PGW 302 is capable of detecting incoming user traffic, such as traffic 312a for example. In response to detecting such user traffic, the PGW 302 transmits message 316 to the OCS 304. Typically, message 316 takes the form of a credit control update request (CCR-U), and may include a request for a traffic quota to allow the incoming user traffic 312a to be passed through a relevant network. As shown in FIG. 3, example message flow 300 includes message 318, which is typically the related credit control update answer (CCA-U) passed from OCS 304 to PGW 302 and granting the quota requested in message 316. As shown in FIG. 3, PGW 302 may continue to receive user traffic, such as user traffic 312b and pass and/or otherwise process that traffic while such traffic remains under the quota afforded to PGW 302 by the OCS 304. Upon detecting that the quota has been exhausted, as depicted at block 320, the PGW 302 may send message 322 (which typically includes a CCR-U message with a request for a quota) to the OCS 304. Upon receipt of the responsive message 324 (which typically takes the form of a CCA-U message granting the quota) from the OCS 304, the PGW 302 may continue to receive and otherwise process user traffic, such that shown as user traffic 312c and 312d. As depicted at block 326, the PGW 302 may iteratively detect that the operative quota afforded to it is exhausted, and (as shown by messages 328 and 330, which take the form of a CCR-U message requesting a quota and a responsive CCR-A message granting the quota) request a new quota from the OCS 304 until, as shown at block 332, the bearer is released. Upon the release of the bearer at block 332, message flow 300 involves the transmission of the credit control termination request (CCR- T) and credit control termination answer (CCA-T) messages 334 which indicate the successful termination of the credit control session 310.

In the example message flow 300 depicted in FIG. 3, it will be appreciated that offline charging (such as through CDRs, for example) applies starting at the moment the bearer is created until it is released, and all user traffic is reported in CDRs. With respect to online charging in the example depicted in FIG. 3, it will be appreciated that OCS resources are consumed during the entire duration of the bearer. As such, in order to support each NB-IoT bearer in the PGW, the OCS would need to reserve resources for the particular NB-IoT device or similar UE device during the entire duration of the bearer. In some contexts, the relevant time period for the particular bearer could be on the order of years in length.

In view of the heavy need for OCS resources and the potentially extreme time scales on which such resources may need to be allocated, it is unlikely that many operators would configure their PGW with the conventional online charging configuration presented in FIG. 3. There are, however, two other conventional methods used by operators to reduce, by some degree, the OCS resources needed to support traffic associated with an NB-IoT device and/or similar devices. However, since those two methods were designed to support infrequent usage of current smartphones, and not to support the typical traffic patterns associated with NB-IoT devices and/or similar devices, they raise a number of issues to be addressed and overcome in contexts that involve significant NB-IoT-type traffic.

FIG. 4 depicts an example message flow 400 between a PGW 402 and an OCS 404. As shown in FIG. 4, example message flow 400 commences at block 406 with the creation of an IP-CAN bearer. Example message flow 400 also contemplates the existence of user traffic 408, which may be generated and/or otherwise associated with an NB-IoT device, and may, such as in the example depicted in FIG. 4, involve the transmission of a series of relatively small and relatively infrequent transmissions 408a, 408b, 408c, and 408d, which may, for example, be single messages sized on the order of a few kilobytes, which are transmitted once every few hours.

As shown at block 410, the PGW 402 is capable of detecting incoming user traffic, such as traffic 408a for example. In response to detecting such user traffic, the PGW 402 transmits message 412 to the OCS 404. Typically, message 412 takes the form of a CCR-I message, and may include a request for a traffic quota to allow the incoming user traffic 408a to be passed through a relevant network. Upon receipt of the message 412 and its included CCR-I request, the OCS 404 establishes an active DCCA session 416, which remains active throughout the relevant time associated with example message flow 400. In connection with receiving message 412 and establishing the active DCCA session 416, the OCS 404 may also transmit message 414 back to the PGW 402. Typically, message 414 takes the form of a CCA-I message granting the quota requested in message 412. As shown in FIG. 4, PGW 402 may continue to receive user traffic, such as user traffic 408b and pass and/or otherwise process that traffic while such traffic remains under the quota afforded to PGW 402 by the OCS 404.

In example message flow 400, the receipt of user traffic 408c triggers the detection that the quota has been exhausted, as depicted at block 418. As a result, and as shown in the particular example message flow 400 depicted in FIG. 4, the PGW 402 may then send message 420 (which typically includes a CCR-U message with a request for a quota) to the OCS 404. Upon receipt of the responsive message 422 (which typically takes the form of a CCA-U message granting the quota) from the OCS 404, the PGW 402 may continue to receive and otherwise process user traffic, such that shown as user traffic 408c and 408d. While not shown in FIG. 4 for the purposes of clarity, the PGW 402 may iteratively receive user traffic 408, detect that the operative quota afforded to it is exhausted, and request a new quota from the OCS 404 until, as shown at block 424, the bearer is released. Upon the release of the bearer at block 424, message flow 400 involves the transmission of the CCR-T and CCA-T messages 426 which indicate the successful termination of the credit control session 416.

In the example message flow 400 depicted in FIG. 4, it will be appreciated that an online charging session is started not when the bearer is created, but is instead delayed until the moment when the UE starts generating traffic. By not requiring that an online charging session or other active DCCA session be initiated at the time the relevant bearer is created, the time period over which the OCS is required to reserve resources for the UE (which may be an IoT device, for example) is reduced. However, this time and resource savings may be relatively small, particularly in situations where the time between the creation of the relevant bearer and the start of the user traffic is relatively brief and the IP-CAN bearer duration is measured on the order of months or years. Moreover, in the example message flow 400 presented in FIG. 4, it will be appreciated that offline charging is still applied from the moment the bearer is created until it is released, and involve the reporting of all UE traffic consumed.

In FIG. 5, one approach to extending the limited reduction in the duration of time for which an active DCCA session must be held open by an OCS is shown as example message flow 500. In general, example message flow 500 modifies an example implementation of message flow 400 by setting a timer which operates to close the DCCA session after a predetermined amount of inactive time.

Similar to FIGS. 3 and 4, FIG. 5 depicts an example message flow 500 between a PGW 502 and an OCS 504. As shown in FIG. 5, example message flow 500 commences at block 506 with the creation of an IP-CAN bearer. Example message flow 500 also contemplates the existence of user traffic 508, which may be generated and/or otherwise associated with an NB-IoT device, and may, such as in the example depicted in FIG. 5, involve the transmission of a series of relatively small and relatively infrequent transmissions 508a, 508b, 508c, and 508d, which may, for example, be single messages sized on the order of a few kilobytes, which are transmitted once every few hours.

As shown at block 510, the PGW 502 is capable of detecting incoming user traffic, such as traffic 508a for example. In response to detecting such user traffic, the PGW 502 transmits message 512 to the OCS 504. Typically, message 512 takes the form of a CCR-I message, and may include a request for a traffic quota to allow the incoming user traffic 508a to be passed through a relevant network. Upon receipt of the message 512 and its included CCR-I request, the OCS 504 establishes an active DCCA session 516. In connection with receiving message 512 and establishing the active DCCA session 516, the OCS 504 may also transmit message 514 back to the PGW 502. Typically, message 514 takes the form of a CCA-I message granting the quota requested in message 512. As shown in FIG. 5, the DCCA session 516 does not remain active pending the release of the relevant bearer. Rather, the DCCA session 516 is closed after a predetermined interval of inactive time. Upon the expiration of the relevant predetermined time interval, the active DCCA session 516 is ended, and messages 518 (which may include CCR-T and CCA-T messages indicating the successful termination of the DCCA session 516, for example) maybe exchanged between the PGW 502 and the OCS 504.

This process can be repeated iteratively each time additional user traffic 508 is detected by the PGW 502 after the passage of a period of inactivity (which may reflect the typical traffic pattern of many IoT devices, which may send relatively small messages relatively infrequently, for example). As shown in FIG. 5, for example, user traffic 508b is detected at block 520 by the PGW 502. In response to detecting traffic 508b, which has been detected after the passage of a predetermined period of time, such that the DCCA session 516 has been terminated, the PGW 502 transmits a CCR-I message 522 requesting a quota from the OCS 504. Upon receipt of the CCR-I message 522, OCS 504 initiates an active DCCA session 526, and transmits the CCA-I message 524 back to the PGW 502. After a predetermined interval of inactivity, the DCCA session 526 is terminated, and related CCR-T and CCA-T messages 528 are exchanged between the PGW 502 and the OCS 504.

As shown in FIG. 5, message flow 500 contemplates that, at a point in time after the termination of the DCCA session 526, additional user traffic 508c is detected (as shown at block 530) by the PGW 502. As with the detection of user traffic 508b at block 520, the PGW 502 transmits a CCR-I message 532 requesting a quota to OCS 504. In response, the OCS 504 opens another active DCCA session 536 and transmits a CCA-I message 534 to the PGW 502 granting a quota. As with DCCA session 526, after the passage of a predetermined time interval, the DCCA session 536 is closed, and corresponding CCR-T and CCA-T messages 538 are exchanged between the PGW 502 and the OCS 504.

As also shown in FIG. 5, message flow 500 further contemplates additional iterations of this set of operations. For example, at a point in time after the termination of the DCCA session 536, user traffic 508d is detected (as shown at block 540) by the PGW 502. As with the detection of user traffic 508b at block 520 and user traffic 508c at block 530, the PGW 502 transmits a CCR-I message 542 requesting a quota to OCS 504. In response, the OCS 504 opens another active DCCA session 546 and transmits a CCA-I message 544 to the PGW 502 granting a quota. As with DCCA session 526 and DCCA session 536, after the passage of a predetermined time interval, the DCCA session 546 is closed, and corresponding CCR-T and CCA-T messages 548 are exchanged between the PGW 502 and the OCS 504. As shown in FIG. 5, example message flow 500 concludes at block 550 with the release of the relevant bearer.

It will be appreciated that, even though the OCS 504 in FIG. 5 is able to reduce the time the OCS allocates resources for each DCCA session (by constantly creating and deleting the DCCA session), it achieves this time reduction at a very high cost. In particular, and as shown in FIG. 5, the signaling to and from the OCS 504 is increased significantly. Particularly in situations where an NB-IoT device or other UE device generates a single message of few kilobytes of application traffic at relatively lengthy time intervals, the PGW and/or OCS needs to create and later on delete multiple DCCA sessions over time, exchanging multiple messages at each NB-IoT traffic transmission cycle. Moreover, in the example presented in FIG. 5, offline charging is still applied from the moment the bearer is created until it is released, and reports all UE traffic consumed. Consequently, the approach depicted in FIG. 5 is relatively message and resource intensive with respect to the PGW and OCS, particularly when viewed in the context of the relatively small, relatively infrequent messages transmitted by many typical NB-IoT devices and/or similar devices.

Example embodiments of the invention described and otherwise disclosed herein address the technical challenges discussed herein with respect to FIGS. 3, 4, and 5, and other technical challenge. In some example implementations, logic modules and/or other mechanisms may be applied and otherwise implemented in a relevant serving gateway (SGW) and in a relevant packet data network gateway (PGW).

In such example implementations, a local configuration may be applied at the SGW to apply one or more thresholds and/or other limits on a per-bearer basis. For example, a local configuration at an SGW may include a threshold quantity of downlink messages (or bytes, for example) per a given time unit, a threshold quantity of uplink messages (or bytes, for example) per a given time unit, and/or another threshold or collection of thresholds that may be applied, on a per-bearer basis, to traffic associated with a NB-IoT device and/or another user equipment device. One of the advantages of exhibited by example embodiments of the invention disclosed herein is that the precise thresholds and the relevant time units can be defined based at least in part on the particulars of the network environment and/or other situation or context in which the specific implementation of the example embodiment of the invention is performed and/or otherwise applied. For example, the particular time unit used in an example implementation may be measured in and/or otherwise set on the order of minutes, hours, deci-hours, and/or any other time unit, including but not limited to one or more time units defined by a relevant vendor and/or operator.

In some example implementations, a local configuration may be applied at the PGW, either independently and/or in conjunction with applying a local configuration at the SGW, to apply one or more thresholds and/or other limits on a per-rating group and/or a per-bearer basis. For example, and similarly to examples involving an SGW, a local configuration at a PGW may include a threshold quantity of downlink messages (or bytes, for example) per a given time unit, a threshold quantity of uplink messages (or bytes, for example) per a given time unit, and/or another threshold or collection of thresholds that may be applied, on a per-bearer basis, to traffic associated with a NB-IoT device and/or another user equipment device. As with example implementations involving an SGW, the precise thresholds and the relevant time units can be defined based at least in part on the particulars of the network environment and/or other situation or context in which the specific implementation of the example embodiment of the invention is performed and/or otherwise applied. For example, the particular time unit used in an example implementation may be measured in and/or otherwise set on the order of minutes, hours, deci-hours, and/or any other time unit, including but not limited to one or more time units defined by a relevant vendor and/or operator.

Some implementations of example embodiments of the invention described and otherwise disclosed herein involve the use of a new metering mechanism (which may be implemented and/or otherwise applied at the SGW and/or PGW) which keeps track of the messages and/or packets detected, received, and/or transmitted per time unit. In some such example implementations, such metering will be applied only to the traffic that exceeds the configured thresholds.

In some such example implementations, charging, (such as offline charging and online charging, for example) will be applied only to the data which exceeds the configured thresholds. Consequently, and particularly in situations where the relevant NB-IoT device is expected to generate traffic which does not break such thresholds, the typical operation of an NB-IoT device involved with example implementations of embodiments of the invention disclosed herein will not trigger the reporting of charging data (such as offline charging data and/or online charging data, for example). As a result, and depending on the particular thresholds set and the operation of the relevant NB-IoT device, the great majority of NB-IoT devices in many contexts and situation will not imply any load to an operator's offline and online charging systems.

With respect to offline charging, some example implementations contemplate that the Charging Data Record (CDR) will not be opened until and/or in response to the receipt and/or other detection of the first packet that exceeds the configured threshold. In such example implementations, the majority of NB-IoT devices will not require to generate Charging Data Records, as the majority of NB-IoT devices will operate below the thresholds set at the relevant SGW and/or PGW. Instead, in such example implementations, only the devices which generate more traffic than allowed pursuant to the thresholds set at the relevant SGW and/or PGW (which may for example, be based at least in part on the terms of a subscription agreement) will use and/or otherwise implicate the operator's offline charging system resources. As a result, it is possible in some such example implementations to generate Charging Data Records to record only the extra traffic (namely, the above-threshold traffic, for example) generated by and/or in connection with a particular NB-IoT device, group of such devices, and/or the like.

With respect to online charging, some example implementations contemplate that an online charging credit control session involving an online charging server will not be created until and/or in response to the receipt and/or other detection of the first packet that exceeds the configured threshold. In such example implementations, the majority of NB-IoT devices will not require online charging sessions, as the majority of NB-IoT devices will operate below the thresholds set at the relevant PGW. Instead, in such example implementations, only the devices which generate more traffic than allowed pursuant to the thresholds set at the relevant PGW (which may for example, be based at least in part on the terms of a subscription agreement) will use and/or otherwise implicate the operator's online charging system resources. As a result, it is possible in some such example implementations to apply credit control operations (such as the granting or denying of a quota, for example) to only the extra traffic (namely, the above-threshold traffic, for example) generated by and/or in connection with a particular NB-IoT device, group of such devices, and/or the like.

It will be appreciated that some implementations of example embodiments of the invention disclosed herein provide to an operator a number of advantageous alternatives to and/or other extensions of rate control mechanisms that may be well-suited for NB-IoT traffic. One such example implementations of the invention disclosed herein that can also be used together with one or more rate control mechanisms may take the form of the following:

In a situation where a particular NB-IoT device is expected to generate for example, two uplink messages and one downlink message per hour, an operator may configure threshold sets at the relevant SGW and/or PGW as two uplink messages and one downlink message per hour. In such a situation, the operator may also configure a threshold set associated with a rate control protocol as ten uplink messages and ten downlink messages per hour. In a given situation, the NB-IoT device may generate the expected two uplink and one downlink messages per hour during approximately ninety percent of the device's operating time. However, in situations where the NB-IoT device is more active and/or otherwise generates five uplink and three downlink messages per hour, the operator may charge a premium for the three excess uplink and two excess downlink messages every hour when such excess messages occur. Moreover, in situations where the NB-IoT generates many more than the expected number of messages, such as fifteen uplink and fifteen downlink messages per hour, for example, the operator may charge a premium for eight uplink and nine downlink messages every hour when such overages occur. Moreover, based on the rate control protocol applied, the operator may also drop the five uplink and five downlink messages per hour that exceed the particular threshold set in connection with the rate control protocol.

As discussed herein, many example implementations of embodiments of the present invention provide for the reduction and/or elimination of network inefficiencies caused by the creation and/or maintenance of active DCCA sessions in an OCS associated with a network environment in response to the receipt of the types of relatively small and/or relatively infrequent messages associated with NB-IoT devices and/or similar devices. In particular, some example implementations of embodiments of the invention contemplate the application and use of one or more threshold sets as a part of local configurations at a relevant SGW and/or PGW, such that NB-IoT traffic and/or similar traffic that stays within such thresholds need not be metered and/or reported in charging data, while traffic that exceeds such thresholds may be metered, reported, and/or made subject to rate control protocols.

While the method, apparatus and computer program product of an example embodiment may be deployed in a variety of different systems, one example of a system that may benefit from the procedures discussed and contemplated herein in accordance with an example embodiment of the present invention is depicted in FIG. 1. The depiction of system environment 100 in FIG. 1 is not intended to limit or otherwise confine the embodiments described and contemplated herein to any particular configuration of elements or systems, nor is it intended to exclude any alternative configurations or systems for the set of configurations and systems that can be used in connection with embodiments of the present invention. Rather, FIG. 1, and the system environment 100 disclosed therein is merely presented to provide an example basis and context for the facilitation of some of the features, aspects, and uses of the methods, apparatuses, and computer program products disclosed and contemplated herein. It will be understood that while many of the aspects and components presented in FIG. 1 are shown as discrete, separate elements, other configurations may be used in connection with the methods, apparatuses, and computer programs described herein, including configurations that combine, omit, and/or add aspects and/or components.

As shown in FIG. 1, the system environment includes one or more user equipment 102 configured to communicate wirelessly, such as via an access network, with a network 106. Although the user equipment may be configured in a variety of different manners, the user equipment may be embodied as a mobile terminal, such as a portable digital assistant (PDA), mobile phone, smartphone, pager, mobile television, gaming device, laptop computer, camera, tablet computer, communicator, pad, headset, touch surface, video recorder, audio/video player, radio, electronic book, positioning device (e.g., global positioning system (GPS) device), or any combination of the aforementioned, and other types of voice and text and multi-modal communications systems.

In addition to the more traditional types of user equipment 102 which may be present within a given system environment, system environment 100 also includes one or more Internet-of-Things (IoT) user equipment devices 110, which may be referred to as IoT devices. Although the IoT device may be configured in a variety of different manners, the IoT devices 110 may be embodied as cellular IoT (C-IoT) devices, narrowband IoT (NB-IoT) devices, and/or other IoT devices, including but not limited to vehicles, appliances, mechanical equipment, HVAC equipment, wearable devices and/or other devices that have been configured to allow for communications and/or other interactions with a network environment.

System environment 100, as depicted in FIG. 1, also includes one or more access points 104a and 104b, such as base stations, (such as node Bs, evolved Node Bs (eNB), or the like, for example). A cellular access point, such as a base station, may define and service one or more cells. The access points may, in turn, be in communication with a network 106, such as a core network via a gateway, such that the access points establish cellular radio access networks by which the user equipment 102 and/or IoT devices 110 may communicate with the network. The system environment 100 of FIG. 1 may include a plurality of different cellular radio access networks including, for example, a 5G radio access network, an LTE radio access network, a UMTS (universal mobile telecommunications system) radio access network, etc. In some example implementations, equipment and other infrastructure associated with multiple different cellular radio access networks may be located at or near structures and/or other equipment associated with a particular access point, such as access point 104a and 104b.

In some implementations of system environment 100, the cellular radio access networks serviced by access points 104a, 104b, and any other access points in a given area are identical, in the sense that as user equipment 102 and/or IoT device 110 moves from an area serviced by access point 104a to an area serviced by access point 104b, the user equipment 102 and/or IoT device 110 is able to access the network 106 via a radio access network provided by the same vendor across access points. Although not shown, the system may also include a controller associated with one or more of the cellular access points, (such as base stations for example), so as to facilitate operation of the access points and management of the user equipment 102 and/or IoT device 110 in communication therewith. As shown in FIG. 1, a system may also include one or more wireless local area networks (WLANs), each of which may be serviced by a WLAN access point 108 configured to establish wireless communications with the user equipment 102 and/or the IoT device 110. As such, the user equipment 102 and/or the IoT device 110 may communicate with the network via a WLAN access point as shown in solid lines in FIG. 1, or, alternatively, via a cellular access point as shown in dashed lines. The radio access networks as well as the core networks may consist of additional network elements as routers, switches, servers, gateways, and/or controllers.

In connection with the use of local configurations at an SGW and/or a PGW with respect to the traffic associated with one or more IoT devices, network performance issues that may be associated with charging for traffic associated with IoT devices, including but not limited to the creation of active DCCA sessions with an OCS, the maintenance of such sessions, and the messaging associated with such sessions may be reduced and/or eliminated. In this regard, enabling an SGW and/or a PGW to apply threshold set to IoT-related traffic and process such traffic in accordance with the threshold set and other protocols established within a network environment can be accomplished by an apparatus 200 as depicted in FIG. 2. The apparatus may be embodied by and/or incorporated into one or more UEs, such as user equipment 102, IoT device 110, or any of the other devices discussed with respect to FIG. 1, such as access points 104a and/or 104b, one or more of WLAN access points 108, and/or devices that may be incorporated or otherwise associated with system environment 100. Alternatively, the apparatus 200 may be embodied by another device, external to such devices. For example, the apparatus may be embodied by a computing device, such as a personal computer, a computer workstation, a server or the like, or by any of various mobile computing devices, such as a mobile terminal, (such as a smartphone, a tablet computer, or the like, for example). In some example implementations, it may be particularly advantageous to implement the apparatus 200 in connection with one or more SGWs, PGWs, and/or other network elements and/or functions.

Regardless of the manner in which the apparatus 200 is embodied, the apparatus of an example embodiment is configured to include or otherwise be in communication with a processor 202 and a memory device 204 and optionally the user interface 206 and/or a communication interface 208. In some embodiments, the processor (and/or co-processors or any other processing circuitry assisting or otherwise associated with the processor) may be in communication with the memory device via a bus for passing information among components of the apparatus. The memory device may be non-transitory and may include, for example, one or more volatile and/or non-volatile memories. In other words, for example, the memory device may be an electronic storage device (such as a computer readable storage medium, for example) comprising gates configured to store data (such as bits, for example) that may be retrievable by a machine (such as a computing device like the processor, for example). The memory device may be configured to store information, data, content, applications, instructions, or the like for enabling the apparatus to carry out various functions in accordance with an example embodiment of the present invention. For example, the memory device could be configured to buffer input data for processing by the processor. Additionally or alternatively, the memory device could be configured to store instructions for execution by the processor.

As described above, the apparatus 200 may be embodied by a computing device. However, in some embodiments, the apparatus may be embodied as a chip or chip set. In other words, the apparatus may comprise one or more physical packages (such as chips, for example) including materials, components and/or wires on a structural assembly (such as a baseboard, for example). The structural assembly may provide physical strength, conservation of size, and/or limitation of electrical interaction for component circuitry included thereon. The apparatus may therefore, in some cases, be configured to implement an embodiment of the present invention on a single chip or as a single "system on a chip." As such, in some cases, a chip or chipset may constitute means for performing one or more operations for providing the functionalities described herein.

The processor 202 may be embodied in a number of different ways. For example, the processor may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor may include one or more processing cores configured to perform independently. A multi-core processor may enable multiprocessing within a single physical package. Additionally or alternatively, the processor may include one or more processors configured in tandem via the bus to enable independent execution of instructions, pipelining and/or multithreading.

In an example embodiment, the processor 202 may be configured to execute instructions stored in the memory device 204 or otherwise accessible to the processor. Alternatively or additionally, the processor may be configured to execute hard coded functionality. As such, whether configured by hardware or software methods, or by a combination thereof, the processor may represent an entity (such as by being physically embodied in circuitry, for example) capable of performing operations according to an embodiment of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions may specifically configure the processor to perform the algorithms and/or operations described herein when the instructions are executed. However, in some cases, the processor may be a processor of a specific device (such as a pass-through display or a mobile terminal, for example) configured to employ an embodiment of the present invention by further configuration of the processor by instructions for performing the algorithms and/or operations described herein. The processor may include, among other things, a clock, an arithmetic logic unit (ALU) and logic gates configured to support operation of the processor.

In some embodiments, the apparatus 200 may optionally include a user interface 206 that may, in turn, be in communication with the processor 202 to provide output to the user and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processor may comprise user interface circuitry configured to control at least some functions of one or more user interface elements such as a display and, in some embodiments, a speaker, ringer, microphone and/or the like. The processor and/or user interface circuitry comprising the processor may be configured to control one or more functions of one or more user interface elements through computer program instructions (such as software and/or firmware, for example) stored on a memory accessible to the processor (such as memory device 204, and/or the like, for example).

The apparatus 200 may optionally also include the communication interface 208. The communication interface may be any means such as a device or circuitry embodied in either hardware or a combination of hardware and software that is configured to receive and/or transmit data from/to a network and/or any other device or module in communication with the apparatus. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

As noted herein, many implementations of example embodiments of the invention described, contemplated, and/or otherwise disclosed herein are directed to applying local configurations at an SGW and/or a PGW to allow for the application of threshold sets to traffic associated with NB-IoT devices and/or similar devices and the handling and charging associated with such traffic. As such, some example implementations are presented below to clarify how aspects of such example embodiments may be advantageous in certain situations. It will be appreciated that, while many of the following examples refer to a PGW and operations that may be performed by a PGW, the reference to a PGW is done for the purposes of clarity, and example implementations conforming to those presented herein and/or otherwise contemplated by the invention disclosed herein may be performed in connection with an SGW, alone or in combination with a PGW, without departing from the spirit and/or scope of the invention disclosed herein.

FIG. 6 depicts an example message flow 600 that involves a PGW 602 and an OCS 604. As shown in FIG. 6, example message flow 600 commences at block 606 with the creation of an IP-CAN bearer. As shown in FIG. 6, example message flow 600 also contemplates the existence of user traffic 608, which may be generated and/or otherwise associated with an NB-IoT device. Consequently, in some example implementations, message flow 600 involves the transmission of a series of relatively small and relatively infrequent transmissions 608a, 608b, 608c, and 608d, which may, for example, be single messages sized on the order of a few kilobytes, which are transmitted once every few hours.

As shown at block 610, the PGW 602 may be capable of detecting incoming user traffic, such as traffic 608a for example. In response to detecting such user traffic, the PGW 602 determines whether the incoming user traffic, including but not limited to the incoming traffic 608a, is under a configured limit that is part of a threshold set associated with the PGW 602 and/or the NB-IoT device associated with traffic 608. In some example implementations, the threshold set is a part of a local configuration applied to the PGW 602.

It will be appreciated that the specific local configuration of the PGW 602 including but not limited to the thresholds within a given threshold set, may vary depending on the particulars of the specific network environment, NB-IoT device or devices and/or other factors. In some example implementations of message flow 600, the one or more thresholds within a threshold set may be based at least in part on a subscription agreement between an individual or entity associated with a given NB-IoT device and an operator of a network that incorporates PGW 602 and/or OCS 604.

In one such example implementation that can be presented in connection with message flow 600 in FIG. 6, a subscription associated with the relevant NB-IoT device may permit the device to transmit up to twenty kilobytes every ten minutes. In such an example implementation, the relevant NB-IoT device may be a smartwatch worn by an individual with a relationship to a hospital or other health center, for example, such that the expected traffic associated with the smartwatch is one message sized to approximately ten kilobytes, which is sent every thirty minutes to provide periodic updates of the vital signs of the individual to the hospital or health center. As such, the expected and/or otherwise typical operation of the smartwatch is well within the limits established by the subscription agreement associated with the smartwatch.

In such a situation, and as shown at block 610, the PGW 602 is able to detect the incoming traffic 608*a*, 608*b*, 608*c*, and 608*d*, and, in each instance, determine that the size, timing, and/or other characteristics of the traffic associated with the relevant NB-IoT device (the smartwatch, in the particular example herein), is under the configured limits. Consequently, because such traffic is within the bounds of the relevant subscription agreement there is no need to apply additional charges to the user of the smartwatch for the traffic 608. Based on the local configuration of the PGW 602 and the determination by the PGW 602 that the traffic 608*a*-608*d* is under the configured limits, the PGW 602 is capable of allowing the traffic to be processed and/or otherwise move through the network at all relevant times until the bearer is released, as shown at block 612.

It will be appreciated, that, as shown in FIG. 6, example implementations of embodiments of the invention disclosed herein allow for the enhancement and/or other improvement of the relevant online charging signalling flow. In situations where the NB-IoT device behaves within its subscription limits, all traffic is free of charge (that is, it does not incur an additional charge beyond that which may be included in the subscription payments). In such situations where the PGW 602 detects that subscriber never breaks its subscription limits the PGW and/or the OCS never creates an online charging session. Consequently, and since no online charging session is created (or necessary), the required signalling per NB-IoT device is zero messages. Moreover, no OCS resources are consumed on a per NB-IoT device in such situations.

In some situations, the PGW, such as PGW 602, may know the subscription limits because it is part of the subscriber's (or other entity associated with the relevant NB-IoT device) charging profile. It will be appreciated that the use of a charging profile can be used to customize the charging parameters on a per-charging group basis. In accordance with some example implementations of embodiments of the invention disclosed herein such charging profile(s) may be enhanced to reflect the local configurations associated with the relevant PGW and/or SGW and to allow for a new configuration that incorporates threshold sets associated with an amount of allowed traffic per time unit (which may be free of charge).

In some contexts, however, not every NB-IoT device will behave and/or otherwise operate within its particular subscription parameters. In some situations arising in such contexts, rate control mechanisms, such as those provided by 3GPP may be introduced and/or implemented in connection with a PLMN and/or APN to drop the traffic in excess of the configured rate control limits. Some implementations of example embodiments of the invention disclosed herein are capable of working in conjunction with such rate control mechanisms such that charging protocols and/or rate control mechanisms that involve an OCS can be applied in situations where traffic that exceeds that allowed under a subscription and/or other threshold set is experienced.

One example approach to coordinating the combination of local PGW and/or SGW threshold sets with OCS-related charging protocols and/or rate control mechanisms is presented in FIG. 7. FIG. 7 depicts an example message flow 700 that involves a PGW 702 and an OCS 704. As shown in FIG. 7, example message flow 700 commences at block 706 with the creation of an IP-CAN bearer. As shown in FIG. 7, example message flow 700 also contemplates the existence of user traffic 608, which may be generated and/or otherwise associated with an NB-IoT device. Consequently, in some example implementations, message flow 700 involves the transmission of a series of transmissions 708*a*-708*h*.

As shown at block 710, the PGW 702 may be capable of detecting incoming user traffic, such as traffic 708*a* for example. In response to detecting such user traffic, the PGW 702 determines whether the incoming user traffic, including but not limited to the incoming traffic 708*a*, is under a configured limit that is part of a threshold set associated with the PGW 702 and/or the NB-IoT device associated with traffic 708. In some example implementations, the threshold set is a part of a local configuration applied to the PGW 702.

For the purposes of clarity, one example implementation that may be performed in connection with message flow 700 involves the same smartwatch with the same subscription terms presented in connection with FIG. 6. As depicted in FIG. 7, for traffic 708*a* and 708*b*, the PGW 702 may detect the traffic and determine that the quantity, timing, and/or other aspects of the traffic 708*a* and 708*b* are within the threshold sets within the local configuration of the PGW 702 and/or otherwise associated with the relevant NB-IoT device (which is, in this example, the smartwatch).

However, unlike the situation presented in FIG. 6 where the smartwatch, in accordance with its typical operation, always remains under the traffic limits associated with its subscription, the smartwatch may have additional functionality that triggers an increased level of traffic. For example, the smartwatch, upon detecting a problem in one or more vital signs, and/or in connection with some other particular functionality, may start triggering bursts of traffic, as shown by the clustering of traffic 708*c*, 708*d*, 708*e*, 708*f*, and 708*g*. For example, the smartwatch may collect and send extra information and/or send information at shorter intervals, such as sending vital signs information every minute, and/or opening a voice communication channel to permit a nurse or doctor at the local health center to immediately and/or verbally communicate with the wearer of the smartwatch. In such situations, the traffic 708*c*-708*g* generated by the NB-IoT device may increase above subscription limits. It will be appreciated that while the specific example herein arises in the context of a smartwatch that exhibits increased traffic at times associated with potential medical emergencies, there are many other example implementations within the scope of example embodiments of the invention where an NB-IoT device and/or other UE device generates extra traffic in certain situations.

As shown in FIG. 7 at block 712, message flow 700 contemplates that the PGW 702 may detect that user traffic, such as user traffic 708*c*-708*g*, exceeds the thresholds established by the relevant threshold sets and/or other aspect of the local configuration of the PGW 702. In some such situations, the PGW 702 will recognize that such traffic may have charging implications. As such, the PGW 702 may transmit message 714 to the OCS 704. In some example implementations, the message 714 includes and/or takes the form of a CCR-I message, and may include a request for a quota from the OCS 704. Upon receipt of message 714, the OCS 704 may establish an active DCCA session 718, and, upon establishment of the DCCA session 718, transmit message 716 back to the PGW 702. In some example implementations, the message 716 may include and/or take the form of a CCA-I message, and may include information related to the granting of a quota to the PGW 702 for the additional traffic 708c-708g.

As a result, in such example implementations, an entity associated with the relevant NB-IoT device (such as the entity responsible for the smartwatch, for example) is charged only for the extra traffic that exceeds the subscription parameters and/or another threshold established in connection with the PGW 702. One of the benefits of this approach is that resources associated with an OCS, such as OCS 704, will be consumed only during those rare events when an NB-IoT device and/or another UE device exceeds its relevant subscription and/or other threshold limit.

In some such example implementation, CDRs (such as those involved with offline charging) will track the operation of the PGW 702 and the OCS 704, at least in the sense that such CDRs will report only the excess traffic which can be charged, instead of reporting all traffic generated by NB-IoT device and/or other relevant UE device, most of which will not be charged (assuming the typical traffic is under the subscription and/or other relevant limit).

As shown in FIG. 7, some example implementations of message flow 700 contemplate the application of a protection timer 720, which may be implemented in connection with PGW 702 and/or the OCS 704, for example, which operates to keep the DCCA session 718 open for a period of time after set of traffic exceeding the thresholds recognized by the PGW 702 have been received and/or otherwise processed. In some situations, the application of the protection timer 720 may prevent the DCCA session 718 from being prematurely closed in a manner that would require additional signalling between the PGW 702 and the OCS 704 if another burst of traffic were to be detected by the PGW 702. Upon the expiration of the protection timer 720, example message flow 700 proceeds such that the PGW 702 sends message 722 to the OCS 704. In some example implementations, message 722 may include and/or take the form of a CCR-T message. Upon receipt of the message 722, the OCS 704 may terminate the active DCCA session 718 and transmit message 724 to the PGW 702. In some example implementations, message 722 may include a CCA-T message and may indicate that the DCCA session 718 has been successfully terminated.

As shown in FIG. 7, the PGW 702 may (after the termination of the DCCA session 718) detect addition user traffic 708h. Depending on the particular configuration of the PGW 702, the timing of the detection of traffic 708h, and/or the size of traffic 708h and/or other factors associated with traffic 708h and/or its detection by PGW 702, the PGW 702 may return to its normal operation (that is, determining that the traffic is within the limits set by the relevant subscription and/or other threshold) and/or may engage in other processing of the traffic 708h. For example, PGW 702 may be locally configured such that traffic 708h, which may arrive after a burst of traffic (such as that shown as traffic 708c-708g), and may exceed a rate control limit, is dropped. In some other example implementations, the detection of traffic 708h may trigger another iteration of the processes and signalling described herein with respect to block 712, DCCA session 718, and messages 714, 716, 722, and 724, for example. As shown at block 726, message flow 700 concludes at block 726, with the release of the relevant bearer.

Referring now to FIG. 8, the operations performed by the apparatus 200 of FIG. 2 in accordance with an example embodiment of the present invention are depicted as an example process flow 800. In this regard, the apparatus includes means, such as the processor 202, the memory 204, the user interface 206, the communication interface 208 or the like, for applying to an SGW a local configuration comprising a threshold set with a set of limits for user traffic associated with a user equipment device; applying to a PGW a local configuration comprising threshold set with a set of limits for the user traffic associated with the user equipment device; detecting if a portion of the user traffic associated with the user equipment device exceeds any such limits; and based at least in part on determining that the portion of the user traffic associated with the user equipment device exceeds a relevant limit, metering, on a per-time-unit basis, the portion of the user traffic that exceeds the relevant limit and establishing a credit control session with an online charging server. As such, the apparatus is generally capable of providing for the application and optimization of protocols governing the allocation of network resources to NB-IoT devices and/or other user equipment devices.

The apparatus includes means, such as the processor 202, the memory 204, the user interface 206, the communication interface 208 or the like, for applying, at a serving gateway (SGW), a first local configuration, wherein the first local configuration comprises a first threshold set comprising a first set of limits, to be applied on a per-bearer basis, for user traffic associated with a user equipment device. With reference to FIG. 8, process flow 800 may commence at block 802, which includes applying a first local configuration (which includes a threshold set), at an SGW. In general, example implementations of block 802 involve establishing a local configuration that includes thresholds that will govern the protocols to be applied to detected user traffic associated with one or more user equipment devices. In many such example implementations, the user equipment device is an Internet-of-Things device, such as an NB-IoT device, for example. In some such example implementations, and as described and/or otherwise disclosed herein, the threshold set included with the local configuration of the SGW includes one or more limits on traffic associated with an NB-IoT device and/or another device, that may be applied on a per-bearer basis. In some example implementations, the set of limits included in the threshold set that is part of the local configuration of the SGW is a threshold quantity and/or amount of downlink messages (per a unit of time). In some such example implementations, and in other example implementations, the set of limits included in the threshold set that is part of the local configuration of the SGW is a threshold quantity and/or amount of uplink messages (per a unit of time). It will be appreciated that the threshold quantity of uplink and/or downlink messages may be set based on any of a number of factors, including but not limited to an agreement, such as a subscription agreement, reached between a network operator and a person associated with the relevant user equipment device, the particulars of the network environment in which an example implementation arises, the expected operation of the user equipment device (such as the typical operation of an NB-IoT device), or other considerations. Likewise, the precise quantity of time associated with a threshold, and the unit of time in which it is measured (such as minutes, hours, deci-hours, or any other time unit), may vary from implementation to implementation based on the precise network environment and/or other factors.

The apparatus also includes means, such as the processor 202, the memory 204, the user interface 206, the communication interface 208 or the like, for applying, at a packet data network gateway (PGW), a second local configuration, wherein the second local configuration comprises a second threshold set comprising a second set of limits, to be applied on a per-bearer basis or a per rating group basis, for the user traffic associated with the user equipment device. With reference to FIG. 8, process flow 800 may continue to block 804, which includes applying a second local configuration with a threshold set to a PGW. As with the local configuration applied in block 802 to an SGW, example implementations of block 804 generally involve establishing a local configuration that includes thresholds that will govern the protocols to be applied to detected user traffic associated with one or more user equipment devices, such an IoT devices (including but not limited to NB-IoT devices, for example). Similar to the threshold set and/or limits associated with an SGW, some example implementations of block 804 contemplate configurations at a PGW that involve thresholds and/or other limits on traffic associated with an NB-IoT device and/or another device that may be applied on a per-bearer basis. In some example implementations, the limits associated with block 804 and the related PGW may be applied on a per-rating-group basis.

In some example implementations, the set of limits included in the threshold set that is part of the local configuration of the PGW is a threshold quantity and/or amount of downlink messages or bytes (per a unit of time). In some such example implementations, and in other example implementations, the set of limits included in the threshold set that is part of the local configuration of the PGW is a threshold quantity and/or amount of uplink messages or bytes (per a unit of time). It will be appreciated that the threshold quantity of uplink and/or downlink messages or bytes may be set based on any of a number of factors, including but not limited to an agreement, such as a subscription agreement, reached between a network operator and a person associated with the relevant user equipment device, the particulars of the network environment in which an example implementation arises, the expected operation of the user equipment device (such as the typical operation of an NB-IoT device), or other considerations. Likewise, the precise quantity of time associated with a threshold, and the unit of time in which it is measured (such as minutes, hours, deci-hours, or any other time unit), may vary from implementation to implementation based on the precise network environment and/or other factors. Moreover, while in some example implementations, the threshold uplink and/or downlink message or bytes quantities may be the same for both an SGW and a PGW, it will be appreciated that an SGW and/or a PGW may be configured to have different threshold sets and/or related limits, depending on the particular network environment and/or situation in which a particular implementation arises.

The apparatus also includes means, such as the processor 202, the memory 204, the user interface 206, the communication interface 208 or the like, for detecting if a portion of the user traffic associated with the user equipment device exceeds any limit in the first threshold set or any limit in the second threshold set. With reference to FIG. 8, process flow 800 may proceed to block 806, which includes detecting user traffic in excess of one or more threshold limits. As discussed herein, including but not limited to the material presented in connection with FIGS. 3, 4, 5, 6, and 7, many example implementations of embodiments of the invention are directed to reducing the amount of signaling to an OCS (online charging) and Charging Data Records generated (offline charging) that must be performed to accommodate traffic from one or more NB-IoT devices and/or similar devices, and to reduce the degree to which OCS resources and offline charging resources must be used and/or held in order to accommodate such traffic. As such, many example implementations are aimed towards configuring an SGW and/or a PGW to be able to ascertain when a particular user device, such as an NB-IoT device, has exceeded a threshold and/or other limit on the traffic that may be associated with that device over a certain time interval. In situations where the NB-IoT device and/or other user equipment device stay within the limits provided for in the relevant threshold set, no signaling of the OCS may be necessary and no CDRs may be generated, since no additional charging may be necessary (particularly when the relevant limits and threshold sets are configured to reflect a subscription agreement and/or other understanding between a device holder and a network operator).

However, in some example implementations of process 800 in general and block 806 in particular, the user equipment device (such as an NB-IoT device, for example) may become associated with traffic that exceeds a relevant limit. In such situations, the apparatus may detect that a limit has been exceeded. In response, the apparatus may trigger the generation of CDRs at the relevant SGW and/or PGW, and may trigger the communication between a PGW and a relevant OCS, (such as through triggering the transmission of a CCR-I message, for example) to indicate that a charging session may be necessary and/or that an additional quota may be necessary to allow the additional traffic to be handled by the network.

The apparatus also includes means, such as the processor 202, the memory 204, the user interface 206, the communication interface 208 or the like, for taking any of a number of steps upon detecting that a limit on the traffic associated with a user equipment device has been exceeded. For example, the apparatus also includes means, such as the processor 202, the memory 204, the user interface 206, the communication interface 208 or the like for, based at least in part on determining that the portion of the user traffic associated with the user equipment device exceeds any limit in the first threshold set or any limit in the second threshold set, metering, on a per-time-unit basis, the portion of the user traffic associated with the user equipment device that exceeds any limit in the first threshold set or any limit in the second threshold set. With reference to FIG. 8, process flow 800 may proceed to block 808, which includes metering excess traffic on a per-time-unit basis. As discussed herein, many example implementations of embodiments of the invention are aimed towards allowing the typical traffic associated with an NB-IoT device (for which such traffic patterns may be considered to consist of relatively small messages sent relatively infrequently) to be transmitted through and/or otherwise handled by the network without incurring charging events. In situations where an NB-IoT device and/or other device departs from its normal operation and becomes associated with more than the normally expected traffic (such as in an emergency situation and/or in connection with the detection of an event or other condition that triggers an alternative behavior by the IoT device, for example), the additional traffic that exceeds a predetermined limit may be subject to charging protocols. As such, some example implementations of block 808 are configured to only track, measure, and/or otherwise meter the traffic that exceeds a limit, which may allow for the avoidance of situations where a user is inadvertently double-charged (at least in the sense that two charges would be incurred for a single packet, message, and/or other piece of traffic). Such example implementations may also allow for the avoidance of excessive CDR generation and or excessive messaging with an OCS and/or unnecessary use of OCS resources.

The apparatus also includes means, such as the processor 202, the memory 204, the user interface 206, the communication interface 208 or the like for, based at least in part on determining that the portion of the user traffic associated with the user equipment device exceeds any limit in the first threshold set or any limit in the second threshold set, establishing a credit control session with an online charging server. With reference to FIG. 8, process flow 800 may proceed to block 810, which includes establishing a credit control session with an online charging server. As discussed herein, some example implementations of embodiments of the invention contemplate applying charging protocols to traffic associated with an NB-IoT device when such traffic exceeds limits contained within local configurations at an SGW and/or a PGW. As such, in some example implementations of process flow 800 in general and block 810 in particular, a credit control session with an OCS may need to be established, and a Charging Data Record may need to be created to handle the charging associated with such excess traffic. While many of the example implementations presented herein involve the use of diameter messages and/or other messages between a PGW, and/or an OCS, such as the use of CCR-I, CCR-U, and CCR-T messages and the corresponding CCA-I, CCA-U, and CCA-T message, any approach to establishing a credit control session with an OCS may be used in example implementations of block 810.

The apparatus may, optionally, also includes means, such as the processor 202, the memory 204, the user interface 206, the communication interface 208 or the like for determining whether to grant or deny a quota for the portion of the user traffic that exceeds any limit in the first threshold set or any limit in the second threshold set. With reference to FIG. 8, process flow 800 may optionally proceed to block 812, which includes determining whether to grant a quota for excess user traffic. Some example implementations of embodiments of the invention disclosed herein contemplate the facilitation of interworking between subscription and/or other agreements associated with an NB-IoT device and/or a similar device, network entities such as a PGW and/or SGW, charging protocols associated with an OCS and/or other network entity, and additional traffic management protocols, such as rate controls and/or other limits on traffic associated with a given device. As such, in some example implementations, the apparatus 200 is capable of determining, alone or in combination with other network elements, whether a quota and/or other permission for traffic that exceeds a particular threshold should be granted. In some example implementations of block 812, the quota and/or other permission may be provided, such as by an OCS via a CCA-I and/or CCA-U message, for example to a PGW to allow the traffic to be passed and/or otherwise processed by the network, and for a charge to be applied for that excess traffic. In some example implementations, however, the traffic may exceed the relevant limits to such a degree that it triggers the operation of rate control protocols, which may trigger the dropping of one or more messages, packets, and/or other data units, based on the particular structure and operation of the rate control protocol.

The apparatus may, optionally, also includes means, such as the processor 202, the memory 204, the user interface 206, the communication interface 208 or the like for determining whether to generate a charging data record (CDR) for the portion of the user traffic that exceeds any limit in the first threshold set or any limit in the second threshold set. As with some example implementations of block 812, some example implementations of the invention disclosed herein contemplate the facilitation of interworking between subscription and/or other agreements associated with an NB-IoT device and/or a similar device, network entities such as a PGW and/or SGW, and protocols associated one or more other network entities to accomplish and optimize the processing and charging for traffic associated with a given device. As such, in some example implementations, the apparatus 200 is capable of determining, alone or in combination with other network elements, whether to generate a CDR for a portion of the user traffic that exceeds a relevant limit. It will be appreciated that any of a number of approaches to determining whether to generate a CDR may be taken in accordance with example implementations of embodiments of the invention, and such approaches may vary depending on the particulars of the network architecture, relevant network components, agreements associated with a given NB-IoT device, and/or other factors present in a given situation. For example, in some example implementations, an SGW may detect that the traffic associated with a particular NB-IoT device or similar device has exceeded a limit contained within a local configuration at the SGW. In such an example situation, upon detecting such excess traffic, the SGW may generate, or cause to be generated, a CDR associated with the traffic that exceeds the relevant limit.

Regardless of the precise aspects of a given implementation of process flow 800 and/or other example implementations of embodiments of the invention disclosed herein, many advantages may be realized over conventional approaches to handling traffic associated with NB-IoT devices and/or similar devices. For example, operators may be able to offer NB-IoT customers with subscriptions tailored to the type of traffic the NB-IoT devices tend to generate, which may improve the convenience and/or the perceived value of the service as seen by the subscribers. In some example implementations, based on the determination of the appropriate thresholds and charging parameters, operators may be able to maximize the revenue from NB-IoT devices, particularly with respect to the costs and/or resource allocations necessary to handle NB-IoT-related traffic. Moreover, particularly to the extent that example implementations avoid the application of rate control and/or other packet-dropping protocols, users may experience better service (at least in the sense that they will tend to experience fewer dropped packets) for NB-IoT devices. It will also be appreciated that many example implementations of embodiments of the invention result in situations where lower amounts of charging resources are consumed by NB-IoT devices. Moreover, it will be appreciated that many example implementations can be readily applied to SGWs and PGWs in a localized manner, particularly in situations where implementation, configuration and enforcement is performed on a local basis.

It will also be appreciated that many example implementations of embodiments of the invention do not prevent or complicate enhancements in a given policy and charging rules function (PCRF) or OCS to provide the values proposed herein as a local configuration. Moreover, some implementations of example embodiments of the invention do not prevent the porting of similar logic in a manner that can be implemented in a service capability exposure function (SCEF) network element (which may, for example, provide an alternative route for NB-IoT-Traffic, particularly where an mobility management entity (MME) can send the IoT traffic to an SCEF and/or to an SGW or PGW).

It will be appreciated that while many of the example implementations described herein arise in the context of NB-IoT devices and related traffic, some example implementations are not limited to only NB-IoT devices, and many of the approaches described and otherwise contemplated herein may be applied to other non IoT traffic. For example, an operator may define a rating group for web-browsing and assign a threshold of 100 kilobytes every 10 minutes for example. In such an example situation, any traffic which exceeds the configured threshold may be charged, or will be dropped according to Online Charging Server commands. For example, when traffic exceeds the threshold, a DCCA session may be created with an OCS and a quota may be requested. At that stage, an OCS can grant or deny the requested extra quota.

It will also be appreciated that portions of the example implementations and/or other approaches presented herein may be combined and or done wholly and/or in part to address the technical challenges identified herein and/or otherwise encountered in the a given situation. For example, in some situations, an operator might wish to reduce online charging signalling through the application and/or other implementation of the techniques and technology presented herein, but may still want the offline charging system to receive the CDRs with all the traffic generated by the UE, rather than only the excess traffic from the configured subscription limits. Nothing in this disclosure should be construed as placing such implementations outside the scope or spirit of the invention disclosed herein, and such example implementations may be advantageous in situations where an operator uses the CDRs for audit purposes, while the billing is performed in connection with the relevant OCS charging data.

As described above, FIGS. 3-8 illustrate message flows and flowcharts of an apparatus 200, method, and computer program product according to example embodiments of the invention. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by the memory device 204 of an apparatus employing an embodiment of the present invention and executed by the processor 202 of the apparatus. As will be appreciated, any such computer program instructions may be loaded onto a computer or other programmable apparatus (such as hardware, for example) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
   causing application of, at a serving gateway, a first local configuration, wherein the local configuration comprises a first threshold set comprising a first set of limits, to be applied on a per-bearer basis, for user traffic associated with a narrow-band Internet-of-Things (NB-IoT) device;
   causing application of, at a packet data network gateway (PGW), a second local configuration, wherein the second local configuration comprises a second threshold set comprising a second set of limits, to be applied on a per-bearer basis or a per rating group basis, for the user traffic associated with the NB-IoT device;
   detecting if a packet of the user traffic associated with the NB-IoT device exceeds any limit in the first threshold set or the second threshold set; and
   based at least in part on determining that a packet of the user traffic associated with the NB-IoT device exceeds any limit in the first threshold set or the second threshold set:

metering, on a per-time-unit basis, the packet of the user traffic associated with the NB-IoT device that exceeds any limit in the first threshold set or the second threshold set, and establishing a credit control session with an online charging server.

2. The method of claim 1, wherein the first set of limits comprises one of:
a threshold limit on a quantity of downlink messages or bytes per a unit of time, or
a threshold limit on a quantity of uplink messages or bytes per a unit of time.

3. The method of claim 1, wherein the second set of limits comprises one of:
a threshold limit on a quantity of downlink messages or bytes per a unit of time, or
a threshold limit on a quantity of uplink messages or bytes per a unit of time.

4. The method of claim 1, wherein the method further comprises:
determining whether to generate a Charging Data Record (CDR) for the portion of the user traffic that exceeds any limit in the first threshold set or the second threshold set.

5. The method of claim 1, wherein the method further comprises:
determining whether to grant or deny a quota for the packet of the user traffic that exceeds any limit in the first threshold set or the second threshold set.

6. An apparatus comprising at least one processor and at least one memory storing computer program code, the at least one memory and the computer program code configured to, with the processor, cause the apparatus to at least:
cause application of, at a serving gateway (SGW), a first local configuration, wherein the first local configuration comprises a first threshold set comprising a first set of limits, to be applied on a per-bearer basis, for user traffic associated with a narrow-band Internet-of-Things (NB-IoT) device;
cause application of, at a packet data network gateway (PGW), a second local configuration, wherein the second local configuration comprises a second threshold set comprising a second set of limits, to be applied on a per-bearer basis or a per rating group basis, for the user traffic associated with the NB-IoT device;
detect if a packet of the user traffic associated with the NB-IoT device exceeds any limit in the first threshold set or the second threshold set; and
based at least in part on determining that the packet of the user traffic associated with the NB-IoT device exceeds any limit in the first threshold set or the second threshold set:
meter, on a per-time-unit basis, the packet of the user traffic associated with the NB-IoT device that exceeds any limit in the first threshold set or the second threshold set, and
establish a credit control session with an online charging server.

7. The apparatus of claim 6, wherein the first set of limits comprises one of:
a threshold limit on a quantity of downlink messages or bytes per a unit of time, or
a threshold limit on a quantity of uplink messages or bytes per a unit of time.

8. The apparatus of claim 6, wherein the second set of limits comprises one of:

a threshold limit on a quantity of downlink messages or bytes per a unit of time, or
a threshold limit on a quantity of uplink message or bytes s per a unit of time.

9. The apparatus of claim 6, wherein the at least one memory and the computer program code are further configured to, with the processor, cause the apparatus to:
determine whether to generate Charging Data Records (CDR) for the packet of the user traffic that exceeds any limit in the first threshold set or the second threshold set.

10. The apparatus of claim 6, wherein the at least one memory and the computer program code are further configured to, with the processor, cause the apparatus to:
determine whether to grant or deny a quota for the packet of the user traffic that exceeds any limit in the first threshold set or the second threshold set.

11. A computer program product comprising at least one non-transitory computer-readable storage medium having computer-executable program code instructions stored therein, the computer-executable program code instructions comprising program code instructions configured to:
cause application of, at a serving gateway (SGW), a first local configuration, wherein the first local configuration comprises a first threshold set comprising a first set of limits, to be applied on a per-bearer basis, for user traffic associated with a narrow-band Internet-of-Things (NB-IoT) device;
cause application of, at a packet data network gateway (PGW), a second local configuration, wherein the second local configuration comprises a second threshold set comprising a second set of limits, to be applied on a per-bearer basis or a per rating group basis, for the user traffic associated with the NB-IoT device;
detect if a packet of the user traffic associated with the NB-IoT device exceeds any limit in the first threshold set or the second threshold set; and
based at least in part on determining that the packet of the user traffic associated with the NB-IoT device exceeds any limit in the first threshold set or the second threshold set:
meter, on a per-time-unit basis, the packet of the user traffic associated with the NB-IoT device that exceeds any limit in the first threshold set or the second threshold set, and
establish a credit control session with an online charging server.

12. The computer program product of claim 11, wherein the first set of limits comprises one of:
a threshold limit on a quantity of downlink messages or bytes per a unit of time, or
a threshold limit on a quantity of uplink messages or bytes per a unit of time.

13. The computer program product of claim 11, wherein the second set of limits comprises one of:
a threshold limit on a quantity of downlink messages or bytes per a unit of time, or
a threshold limit on a quantity of uplink messages or bytes per a unit of time.

14. The computer program product of claim 11, wherein the computer-executable program code instructions further comprise program code instructions configured to:
determine whether to generate a Charging Data Record (CDR) for the packet of the user traffic that exceeds any limit in the first threshold set or the second threshold set.

15. The computer program product of claim 11, wherein the computer-executable program code instructions further comprise program code instructions configured to:
  determine whether to grant or deny a quota for the packet of the user traffic that exceeds any limit in the first threshold set or the second threshold set.

* * * * *